United States Patent
Miyaguchi

(10) Patent No.: US 10,686,958 B2
(45) Date of Patent: Jun. 16, 2020

(54) UPDATING SETTINGS OF A PLURALITY OF IMAGE FORMING APPARATUSES

(71) Applicant: Daigo Miyaguchi, Kanagawa (JP)

(72) Inventor: Daigo Miyaguchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/969,163

(22) Filed: May 2, 2018

(65) Prior Publication Data

US 2018/0332186 A1    Nov. 15, 2018

(30) Foreign Application Priority Data

May 12, 2017 (JP) .................................. 2017-095613

(51) Int. Cl.
*H04N 1/00* (2006.01)

(52) U.S. Cl.
CPC ....... *H04N 1/00973* (2013.01); *H04N 1/0097* (2013.01); *H04N 1/00244* (2013.01); *H04N 2201/0094* (2013.01)

(58) Field of Classification Search
CPC .. H04N 1/00973; H04N 1/0097; G06F 3/129; G06F 3/1205; G06F 3/1209; G06F 3/123
See application file for complete search history.

(56) References Cited

U.S. PATENT DOCUMENTS

| 2012/0194861 | A1 | 8/2012 | Miyaguchi |
| 2012/0320420 | A1 | 12/2012 | Mochizuki et al. |
| 2016/0142433 | A1* | 5/2016 | Nasu ...................... H04L 63/20 726/25 |

FOREIGN PATENT DOCUMENTS

| JP | 2007-241582 | 9/2007 |
| JP | 2012-185748 | 9/2012 |
| JP | 2014-217996 | 11/2014 |

* cited by examiner

*Primary Examiner* — Eric A. Rust
(74) *Attorney, Agent, or Firm* — Harness, Dickey & Pierce, P.L.C.

(57) ABSTRACT

An information processing apparatus to convert setting information described in a first format matched to a first electronic apparatus into setting information described in a second format matched to a second electronic apparatus includes circuitry to acquire the setting information related to settings of the first electronic apparatus, refer to first conversion information associating information related to a data storage of a set value and identification information of each setting item set for the first electronic apparatus to acquire the set value of each setting item set for the first electronic apparatus, refer to second conversion information associating the identification information of each setting item set for the first electronic apparatus and identification information of each setting item common to a plurality of models of electronic apparatuses, associate the set value acquired from the setting information of the first electronic apparatus and the common identification information.

19 Claims, 25 Drawing Sheets

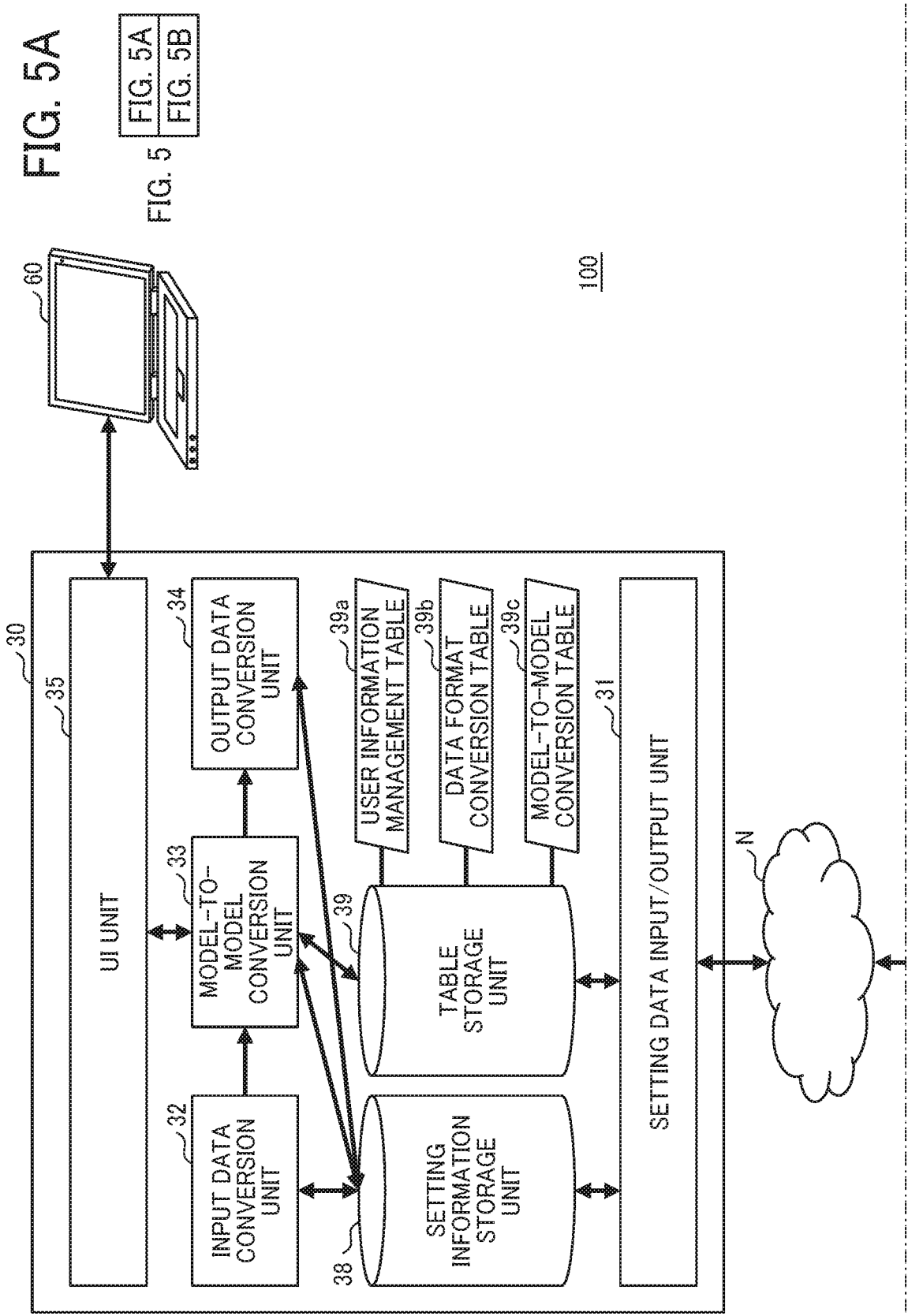

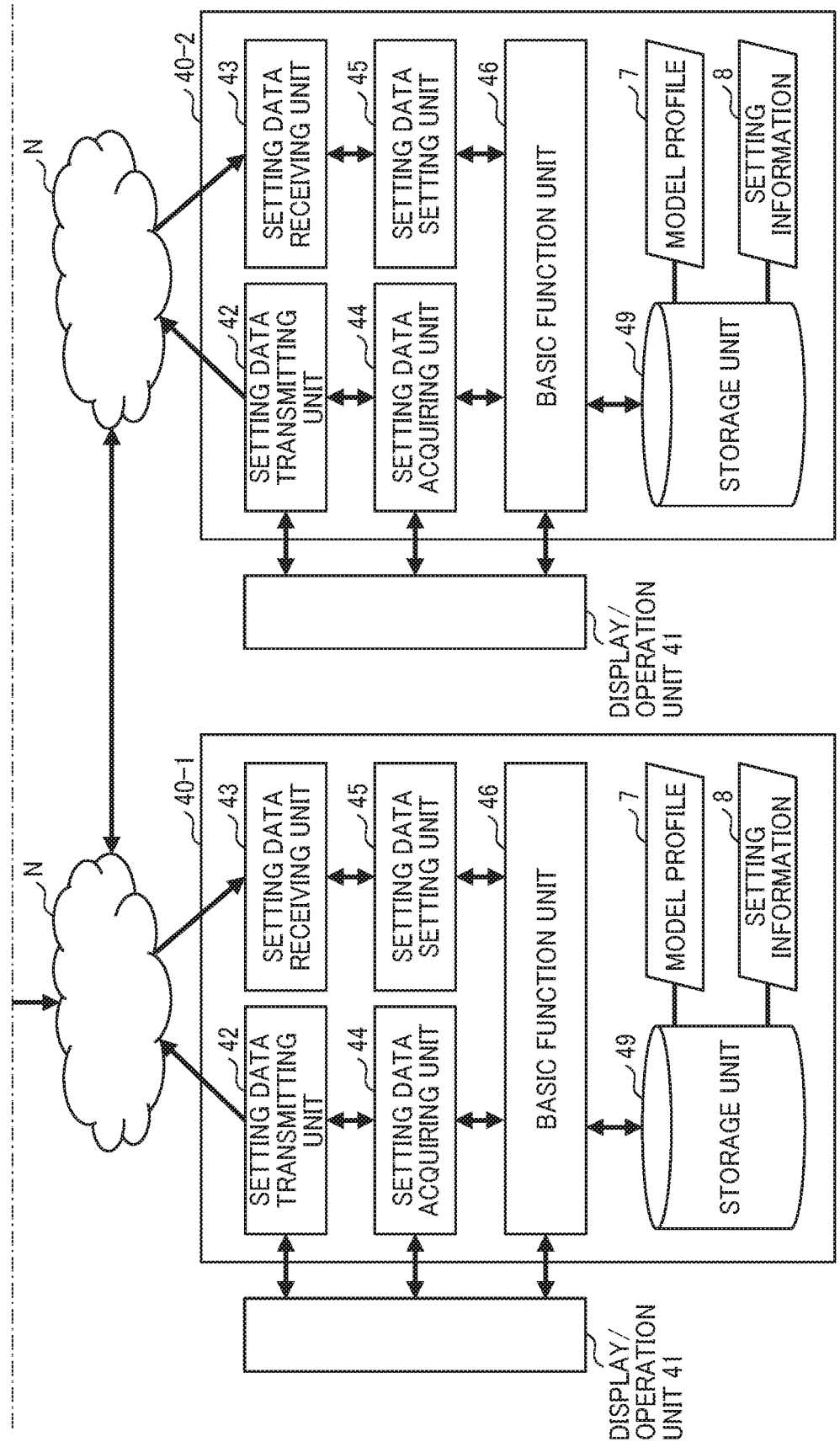

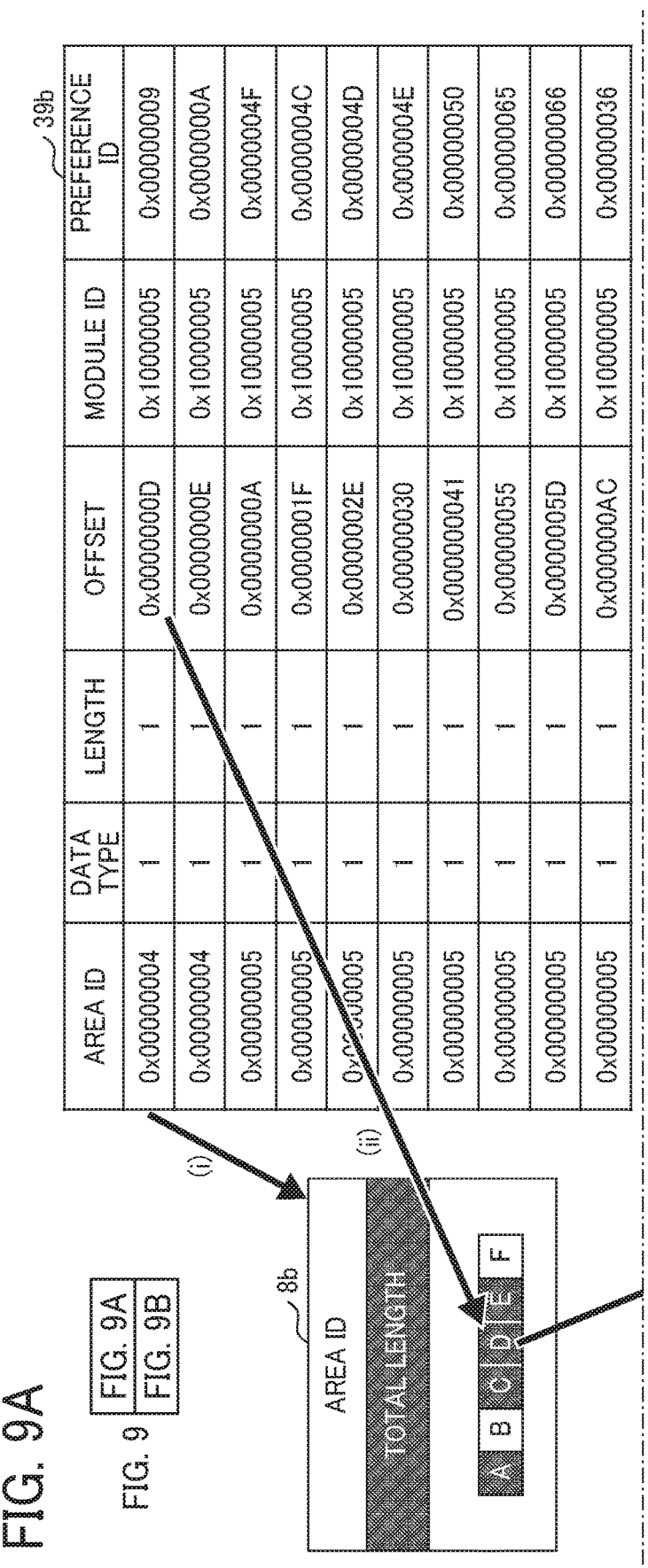

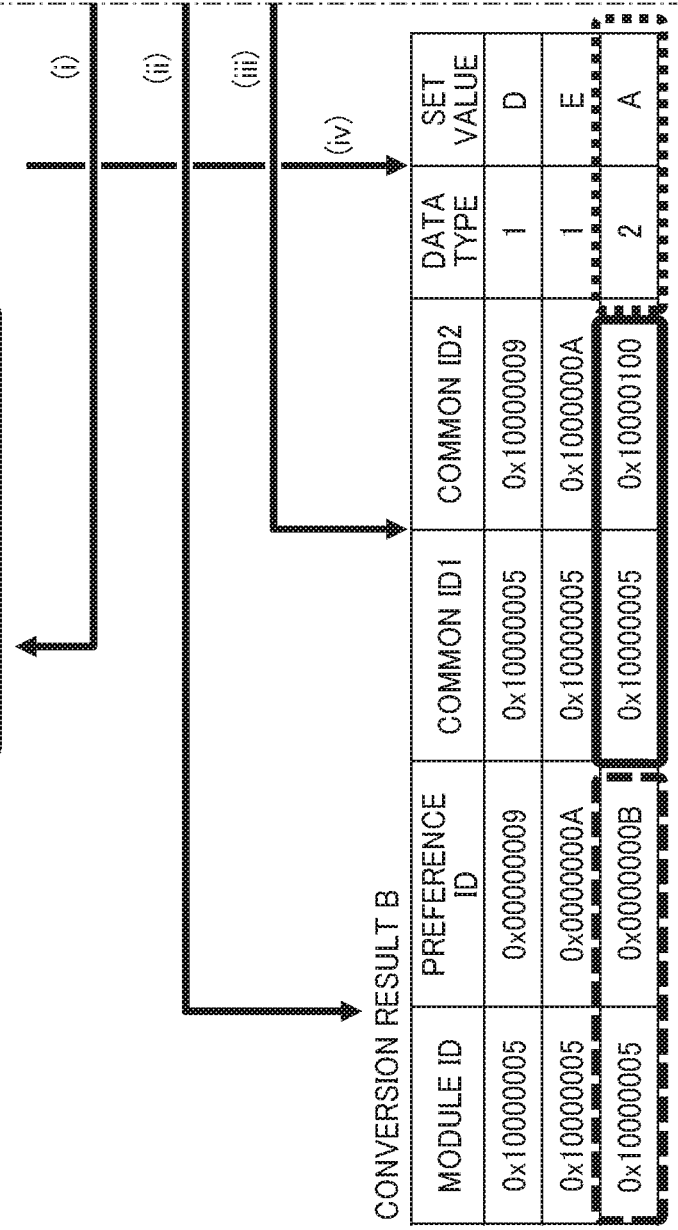

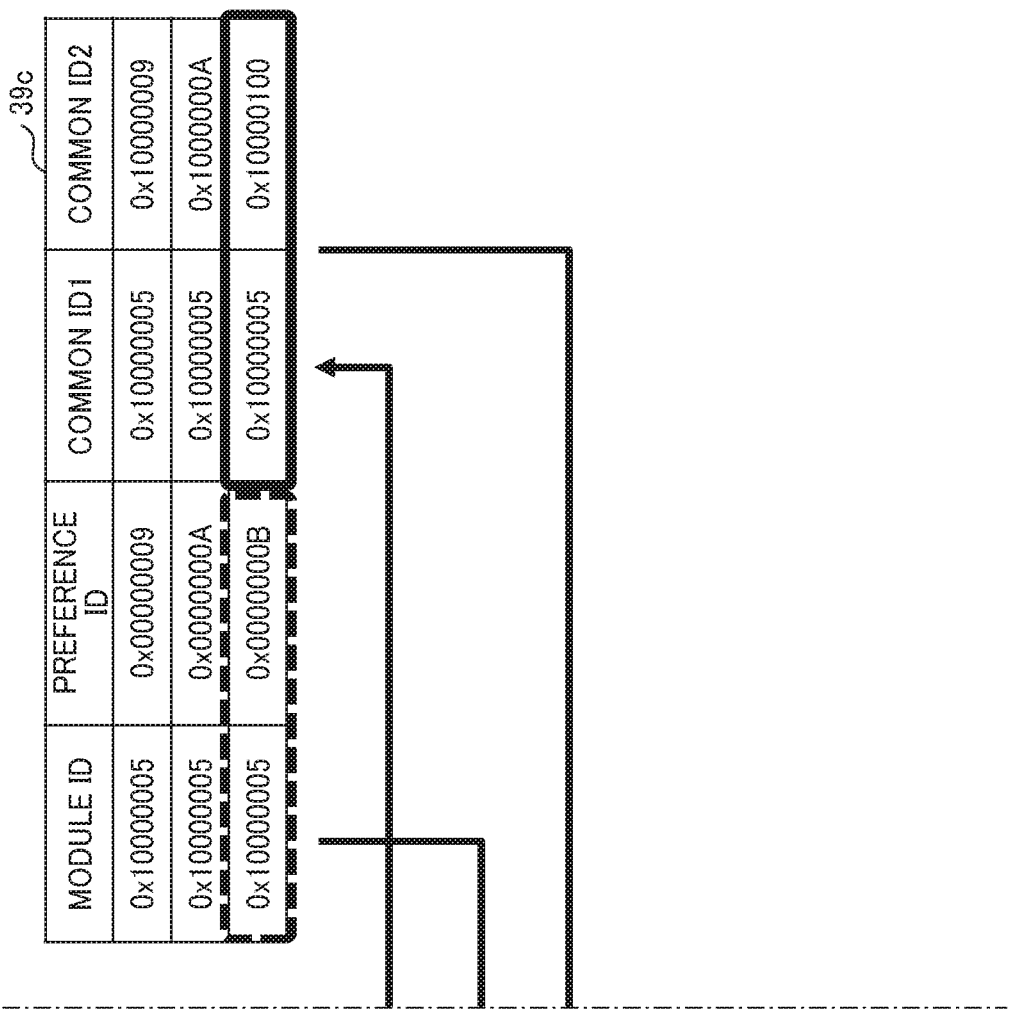

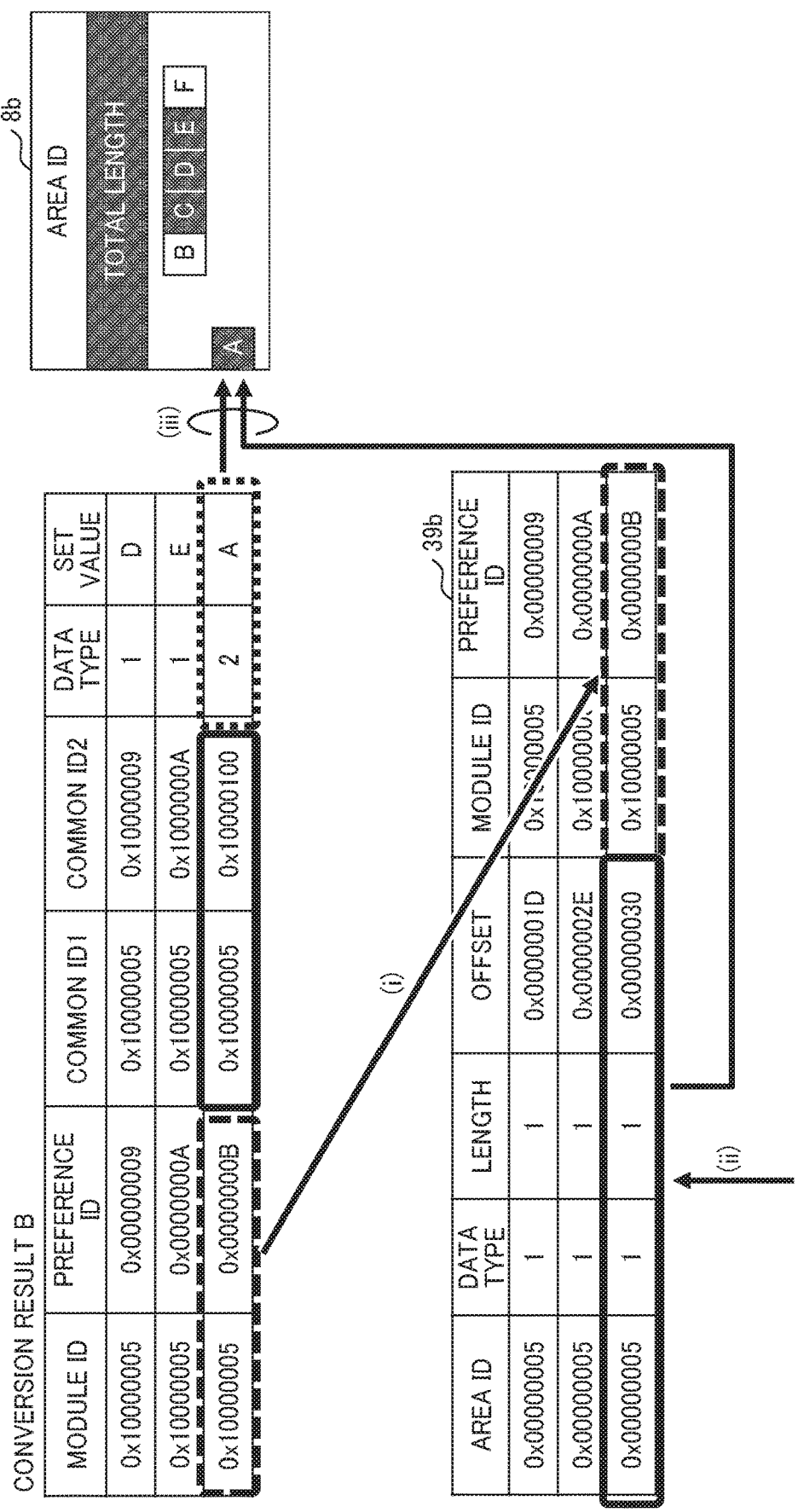

SP READ ITEM

| NUMBER OF ENTRY | | |
|---|---|---|
| SP NUMBER | LENGTH | SET VALUE |
| SP NUMBER | LENGTH | SET VALUE |
| SP NUMBER | LENGTH | SET VALUE |

⋮

| SP NUMBER | LENGTH | SET VALUE |
|---|---|---|

UPDATING SETTINGS OF A PLURALITY OF IMAGE FORMING APPARATUSES

CROSS-REFERENCE TO RELATED APPLICATIONS

This patent application is based on and claims priority pursuant to 35 U.S.C. § 119(a) to Japanese Patent Application No. 2017-095613, filed on May 12, 2017, in the Japan Patent Office, the entire disclosure of which is hereby incorporated by reference herein.

BACKGROUND

Technical Field

This disclosure relates to an information processing apparatus, an electronic apparatus, a setting information handling method, and a storage medium.

Background Art

Electronic apparatuses such as printers used in offices or other locations can be customized in line with usability of users. Setting items of electronic apparatuses that users can customize have been increasing as functions of electronic apparatuses have been added and/or improved. Further, the setting items can be set by customer engineers (CEs) having special expertise on the electronic apparatuses.

In offices and other locations, users may replace currently-used electronic apparatuses with new electronic apparatuses, or purchase new electronic apparatuses, in which since one manufacturer releases a number of models for electronic apparatuses such as printers, a model of currently-used electronic apparatuses and a model of new electronic apparatuses may differ. It is preferable for users that usability of new electronic apparatuses maintains the same level of the currently-used electronic apparatus even if the models of electronic apparatuses is different. However, users may need a longer time to set currently-customized settings into new electronic apparatuses.

SUMMARY

As one aspect of the present invention, an information processing apparatus to convert setting information set for a first electronic apparatus described in a first format matched to the first electronic apparatus into setting information set for a second electronic apparatus described in a second format matched to the second electronic apparatus is devised. The information processing apparatus includes circuitry to acquire setting information including one or more setting items related to settings of a first electronic apparatus from the first electronic apparatus, refer to first conversion information associating information related to a data storage of a set value of each of the setting items set for the first electronic apparatus and identification information of each of the setting items set for the first electronic apparatus to acquire the set value of each of the setting items from the setting information of the first electronic apparatus, refer to second conversion information associating the identification information of each of the setting items set for the first electronic apparatus and identification information of each of the setting items common to a plurality of models of electronic apparatuses, associate the set value acquired from the setting information of the first electronic apparatus and the common identification information common to the plurality of models of electronic apparatuses.

As another aspect of the present invention, a method of handling setting information using an information processing apparatus converting setting information set for a first electronic apparatus described in a first format matched to the first electronic apparatus into setting information set for a second electronic apparatus described in a second format matched to the second electronic apparatus is devised. The method includes acquiring the setting information including one or more setting items related to settings of a first electronic apparatus from the first electronic apparatus, referring to first conversion information associating information related to a data storage of a set value of each of the setting items set for the first electronic apparatus and identification information of each of the setting items set for the first electronic apparatus to acquire the set value of each of the setting items from the setting information of the first electronic apparatus, referring to second conversion information associating the identification information of each of the setting items set for the first electronic apparatus and identification information of each of the setting items common to a plurality of models of electronic apparatuses, associating the set value acquired from the setting information of the first electronic apparatus and the common identification information common to the plurality of models of electronic apparatuses, and converting the setting information set for the first electronic apparatus described in a first format matched to the first electronic apparatus into setting information set for a second electronic apparatus described in a second format matched to the second electronic apparatus.

As another aspect of the present invention, a non-transitory computer readable storage medium storing one or more instructions that, when executed by one or more processors, cause the one or more processors to execute a method of handling setting information using an information processing apparatus converting setting information set for a first electronic apparatus described in a first format matched to the first electronic apparatus into setting information set for a second electronic apparatus described in a second format matched to the second electronic apparatus is devised. The method includes acquiring the setting information including one or more setting items related to settings of a first electronic apparatus from the first electronic apparatus, referring to first conversion information associating information related to a data storage of a set value of each of the setting items set for the first electronic apparatus and identification information of each of the setting items set for the first electronic apparatus to acquire the set value of each of the setting items from the setting information of the first electronic apparatus, referring to second conversion information associating the identification information of each of the setting items set for the first electronic apparatus and identification information of each of the setting items common to a plurality of models of electronic apparatuses, associating the set value acquired from the setting information of the first electronic apparatus and the common identification information common to the plurality of models of electronic apparatuses, and converting the setting information set for the first electronic apparatus described in a first format matched to the first electronic apparatus into setting information set for a second electronic apparatus described in a second format matched to the second electronic apparatus.

BRIEF DESCRIPTION OF THE DRAWINGS

A more complete appreciation of the description and many of the attendant advantages and features thereof can be readily obtained and understood from the following detailed description with reference to the accompanying drawings, wherein:

FIGS. 5A and 5B illustrate an example of a functional block diagram of the setting information handling system including the electronic apparatus and the conversion server;

FIGS. 9A and 9B schematically illustrate a process of converting setting information of a first electronic apparatus into setting information common to models of electronic apparatuses using a model-to-model conversion table and a data format conversion table suitable for a model of the first electronic apparatus by using an input data conversion unit;

FIGS. 10A and 10B illustrate an example of conversion result B generated using conversion result A and a model-to-model conversion table suitable for a model of a second electronic apparatus;

FIG. 11 illustrates an example of converting conversion result B into setting information described in a format matched to the second electronic apparatus using a data format conversion table suitable for a model of the second electronic apparatus;

FIG. 17 illustrates an example of a storage format of service setting data;

The accompanying drawings are intended to depict embodiments of the present invention and should not be interpreted to limit the scope thereof. The accompanying drawings are not to be considered as drawn to scale unless explicitly noted.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, a description is given of a setting information handling system and a method of handling setting information by the setting information handling system of one or more embodiments of the present invention with reference to one or more drawings.

Figure 1:
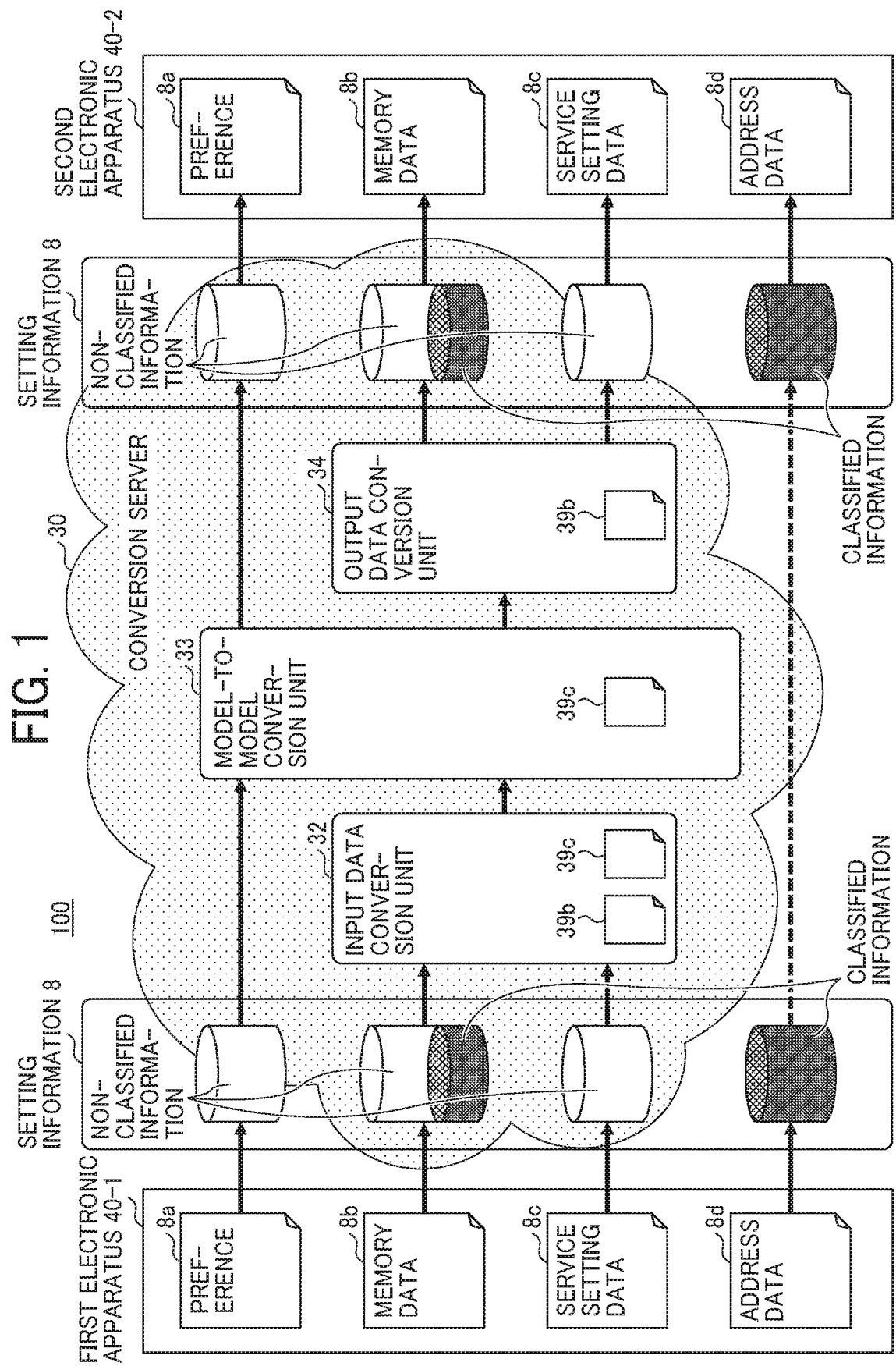
FIG. 1 illustrates an example of processing of a setting information handling system of an embodiment.

Processing in System:

FIG. 1 illustrates an example of a processing in a setting information handling system 100 of an embodiment. As illustrated in FIG. 1, the setting information handling system 100 includes, for example, a first electronic apparatus 40-1, a conversion server 30, and a second electronic apparatus 40-2. In the setting information handling system 100, each of the electronic apparatus 400 is assumed to be a multi-functional apparatus, but not limited thereto. In this description, it is assumed that the first electronic apparatus 40-1 exports setting information 8, and the second electronic apparatus 40-2 imports the setting information 8.

Due to differences in hardware configurations, software configurations, and design policies, a memory space set in the first electronic apparatus 40-1 and a memory space set in the second electronic apparatus 40-2 may be different. Further, a storage location of setting item that should correspond to each other between the first electronic apparatus 40-1 (e.g., currently used apparatus) and the second electronic apparatus 40-2 (e.g., new apparatus) may also differ. In this case, even if the setting information of the first electronic apparatus 40-1 currently used by a user is transferred to the second electronic apparatus 40-2 as it is (e.g., to the same address), the second electronic apparatus 40-2 may not perform the desired operation. In this description, it is assumed that the first electronic apparatus 40-1 and the second electronic apparatus 40-2 are different in models and/or types.

Therefore, the conversion server 30 adjusts the memory space of the first electronic apparatus 40-1 to associates or correlates the same setting item between the first electronic apparatus 40-1 and the second electronic apparatus 40-2, and adjusts the memory space of the second electronic apparatus 40-2 to set the setting information in the second electronic apparatus 40-2. As illustrated in FIG. 1, the conversion server 30 includes, for example, an input data conversion unit 32, a model-to-model conversion unit 33, and an output data conversion unit 34 to be described later.

The electronic apparatus 40 stores, for example, preference 8*a*, memory data 8*b*, service setting data 8*c*, and address data 8*d* as the setting information 8 as illustrated in FIG. 1. The details of these data are to be described later. These data are only examples of the setting information, and other setting information may also be set. The conversion server 30 converts the setting information 8 by applying a conversion method in accordance with types of setting information because the conversion method suitable for the setting information differs depending on the types of setting information 8.

Preference 8*a*: since the preference 8*a* is a value set by a user, the preference 8*a* is saved or stored in association with a setting item. Therefore, the model-to-model conversion unit 33 converts each setting item of the first electronic apparatus 40-1 to each setting item of the second electronic apparatus 40-2 in view of a relationship of the setting items between the first electronic apparatus 40-1 to the second electronic apparatus 40-2. The memory space may not be considered for the preference 8*a*.

Memory data 8*b*: the memory data 8*b* is information used by a module operable in the electronic apparatus 40, wherein the module is a functional unit such as an application. Therefore, the conversion server 30 is required to acquire the memory data 8*b* in accordance with a memory space of a specific model of the electronic apparatus 40 to acquire the memory data 8*b* as data interpretable by a specific model of the electronic apparatus 40. Therefore, the input data conversion unit 32 acquires a set value for each setting item by referring to a data format conversion table 39*b* suitable for a specific model of the first electronic apparatus 40-1. Further, the input data conversion unit 32 refers to the model-to-model conversion table 39*c* suitable for the specific model of the first electronic apparatus 40-1 to change the setting item set for the first electronic apparatus 40-1 into the setting item described in a format common to a plurality of models of the electronic apparatus 40, in which the input data conversion unit 32 assigns identification information common to the plurality of models of the electronic apparatus 40 to the setting item. Then, the model-to-model conversion unit 33 refers to the model-to-model conversion table 39*c* suitable for a specific model of the second electronic apparatus 40-2, and the input data conversion unit 32 assigns identification information of the setting item of the second electronic apparatus 40-2 to the setting information. Further, the output data conversion unit 34 refers to a data format conversion table 39*b* suitable for the specific model of the second electronic apparatus 40-2, and arranges a set value in a storage location in view of the memory space of the second electronic apparatus 40-2 for each setting item.

Service setting data 8*c*: since the service setting data 8*c* is stored in the memory space of the electronic apparatus 40 in the same manner as the memory data 8*b*, the service setting data 8*c* is converted sequentially by the input data conversion unit 32, the model-to-model conversion unit 33, and the output data conversion unit 34.

Address data 8*d*: the address data 8*d* is information that does not change between the plurality of models of the electronic apparatus 40. For example, one name set in the first electronic apparatus 40-1 is also the same one name in the second electronic apparatus 40-2. Therefore, the conversion of address data 8*d* is not required.

By performing the above described conversion, the memory data 8*b* and the service setting data 8*c* converted by the conversion server 30 can be viewed or changed by a customer engineer (CE) or user. Since manufacturers of the electronic apparatus 40 manage contents of each setting item of the preference 8*a*, current settings of each setting item of the preference 8*a* acquired from the first electronic apparatus 40-1 is known. Therefore, the CE or user can check and change the preference 8*a* at the conversion server 30. Since the address data 8*d* is not changed among a plurality of models of the electronic apparatus 40, the CE or user can view and change the address data 8*d* if the address data 8*d* is decrypted or not encrypted.

On the other hand, data storage or data management of the memory data 8*b* and the service setting data 8*c* may differ depend on the models of the electronic apparatus 40. In the embodiment, data is converted into a common format that does not depend on the models of the electronic apparatus 40 for each of the setting items by using the data format conversion table 39*b* and the model-to-model conversion table 39*c*. Therefore, the CE or user can check and change the memory data 8*b* and the service setting data 8*c* at the conversion server 30.

In this way, the setting information handling system 100 can convert the setting information such as the memory data 8*b* and the service setting data 8*c*, which are difficult to convert in conventional arts, using the conversion server 30 so that manual workloads of CE or user after importing the setting information can be reduced. Further, since the memory data 8*b* and the service setting data 8*c* are converted into a common format, the CE or user can view and change the data before importing the data.

Terms:

The setting information related to settings of the electronic apparatus 40 means electronic information set in the electronic apparatus 40. The setting information varies depending on path of setting, contents of information, and functions to be managed. The setting information includes information that does not require conversion, information that differs only for handling setting items, and information indicating different memory spaces.

The setting item of the setting information indicates the smallest unit of information interpretable by the electronic apparatus 40. The set value is a value set for the setting item.

The format of setting information means an information management format common to the setting information, such as a configuration, a layout, and a data reading method used for processing and managing the setting information. The format common to different models is extracted from different models as a format interpretable by any model. The common format for different models does not change among different models.

Information related to data storage includes information used for acquiring a set value from a location where the set value is stored. The information related to the data storage includes information of, for example, storage location, data type, length (i.e., size of set value), and endianness (i.e., arrangement order of data).

Figure 2:
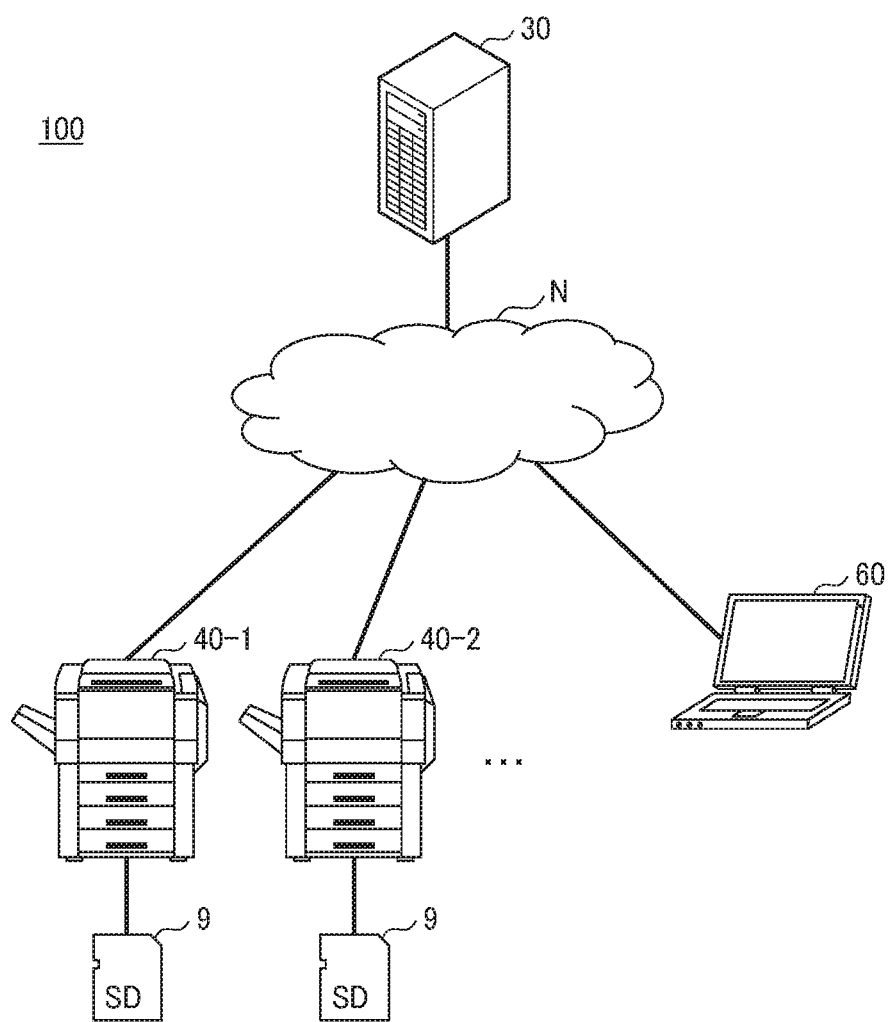
FIG. 2 illustrates an example of a configuration of the setting information handling system of FIG. 1.

System Configuration:

FIG. 2 illustrates an example of a schematic configuration of the setting information handling system 100. The setting information handling system 100 includes, for example, a plurality of electronic apparatuses 40 such as the first electronic apparatus 40-1 and the second electronic apparatus 40-2, the conversion server 30, and a terminal apparatus 60 connected with each other via a network N wirelessly and/or by wire. Further, as illustrated in FIG. 2, a recording medium 9 such as a removable and portable memory can be attached to each of the first electronic apparatus 40-1 and the second electronic apparatus 40-2.

In this description, it is assumed that the first electronic apparatus 40-1 is one of the electronic apparatuses 40 that is already set with the setting information 8 including the setting item, and it is assumed that the second electronic apparatus 40-2 is one of the electronic apparatuses 40, to which the setting information 8 of the first electronic apparatus 40-1 is to be transferred and set. Typically, the second electronic apparatus 40-2 may be a newly purchased electronic apparatus 40, but not limited thereto. The second electronic apparatus 40-2 can be any electronic apparatus to which the setting information 8 of the first electronic apparatus 40-1 is to be transferred and set. The setting information 8 of the first electronic apparatus 40-1 is to be transferred and set in the second electronic apparatus 40-2 when the first electronic apparatus 40-1 is replaced with the second electronic apparatus 40-2, or the second electronic apparatus 40-2 is added while the first electronic apparatus 40-1 is also being used.

Usability of the first electronic apparatus 40-1 and the second electronic apparatus 40-2 can be enhanced by customizing the electronic apparatuses 40 by a user. The customization means changing of standard settings of the electronic apparatuses 40 in accordance with a user's convenience or preference. That is, the electronic apparatus 40 is an apparatus that can be operated based on the setting information 8 changeable by the user. However, to be described later, the setting information 8 is not limited to information set by the user, but the setting information 8 includes, for example, information set by a customer engineer (CE), information managed by application, and information relating to an engine such as printing function.

The first electronic apparatus 40-1 and the second electronic apparatus 40-2 are, for example, multifunctional apparatuses, projectors, electronic information boards, and teleconference terminals, but not limited thereto.

The multifunctional apparatus means a multi-functional peripheral apparatus including a plurality of functions, such as a printer, a scanner, and a facsimile. The printer and scanner can be combined to perform a copy function, the scanner and a transmission function of the facsimile can be combined to transmit image data, and the printer and a reception function of the facsimile can be combined to receive image data. The multifunctional apparatus may be also referred to as an image forming apparatus, an image processing apparatus, a printer, a copier, a multi-function peripherals (MFP), or the like.

A projector is an apparatus that projects images. The projector may be also referred to an image projector. The electronic information board detects coordinates pointed by a pointing device, such as an electronic pen or a finger, and displays a stroke, which is a collection of connected coordinates, on a display. The electronic information board may be also referred to as an electronic whiteboard. The teleconference terminal transmits and receives image data and audio data between different locations or sites, and displays images on a display and outputs a voice from a speaker to enable participants using the teleconference terminal to perform a video conference.

Further, the electronic apparatus 40 may be other apparatus, such as digital signage, digital cameras, and drones, which can be configured to customize the setting information 8.

The network N is constructed, for example, by a local area network (LAN), which is disposed in a location where the electronic apparatus 40 is installed, a provider network of a provider used for connecting the LAN to the Internet, and a line provided by a line carrier. If the network N includes multiple LANs, the network N is referred to as a wide area network (WAN). Further, the network N may include the Internet that connects computers and networks globally and interactively.

The network N may be a wired network or a wireless network, and a combination of both. Further, when the electronic apparatus 40 is directly connected to a public circuit network, the electronic apparatus 40 can be connected to a provider network without the LAN. When connecting the electronic apparatus 40 wirelessly, communication standards such as Wi-Fi (registered trademark), Bluetooth (registered trademark), 3G, 4G, or long term evolution (LTE) can be used.

The terminal apparatus 60 is used by a CE or user to designate the first electronic apparatus 40-1 and the second electronic apparatus 40-2 to the conversion server 30, and to view and/or change the setting information transmitted from the first electronic apparatus 40-1 to the conversion server 30. Further, the CE or user uses the terminal apparatus 60 to transmit the setting information 8 stored in the recording medium 9 to the conversion server 30, and to receive the setting information 8 from the conversion server 30 after the conversion processing. The conversion means converting the setting information 8 described in one format matched to the first electronic apparatus 40-1 into the setting information 8 described in another format matched to the second electronic apparatus 40-2. The terminal apparatus 60 may be configured to operate a browser software or an application equivalent thereto. The terminal apparatus 60 may be, for example, a personal computer (PC), a smartphone, a tablet terminal, a cellular phone, a personal data assistant (PDA), a game machine, and a car navigation system, but not limited thereto.

The conversion server 30 is an information processing apparatus that converts the setting information 8 described in one format matched to the first electronic apparatus 40-1 into the setting information 8 described in another format matched to the second electronic apparatus 40-2. The details of the conversion method are to be described later. Further, it is preferable that the conversion server 30 uses cloud computing. The cloud computing means hardware resources on the network can be used without being aware of specific hardware resources.

Figure 3:
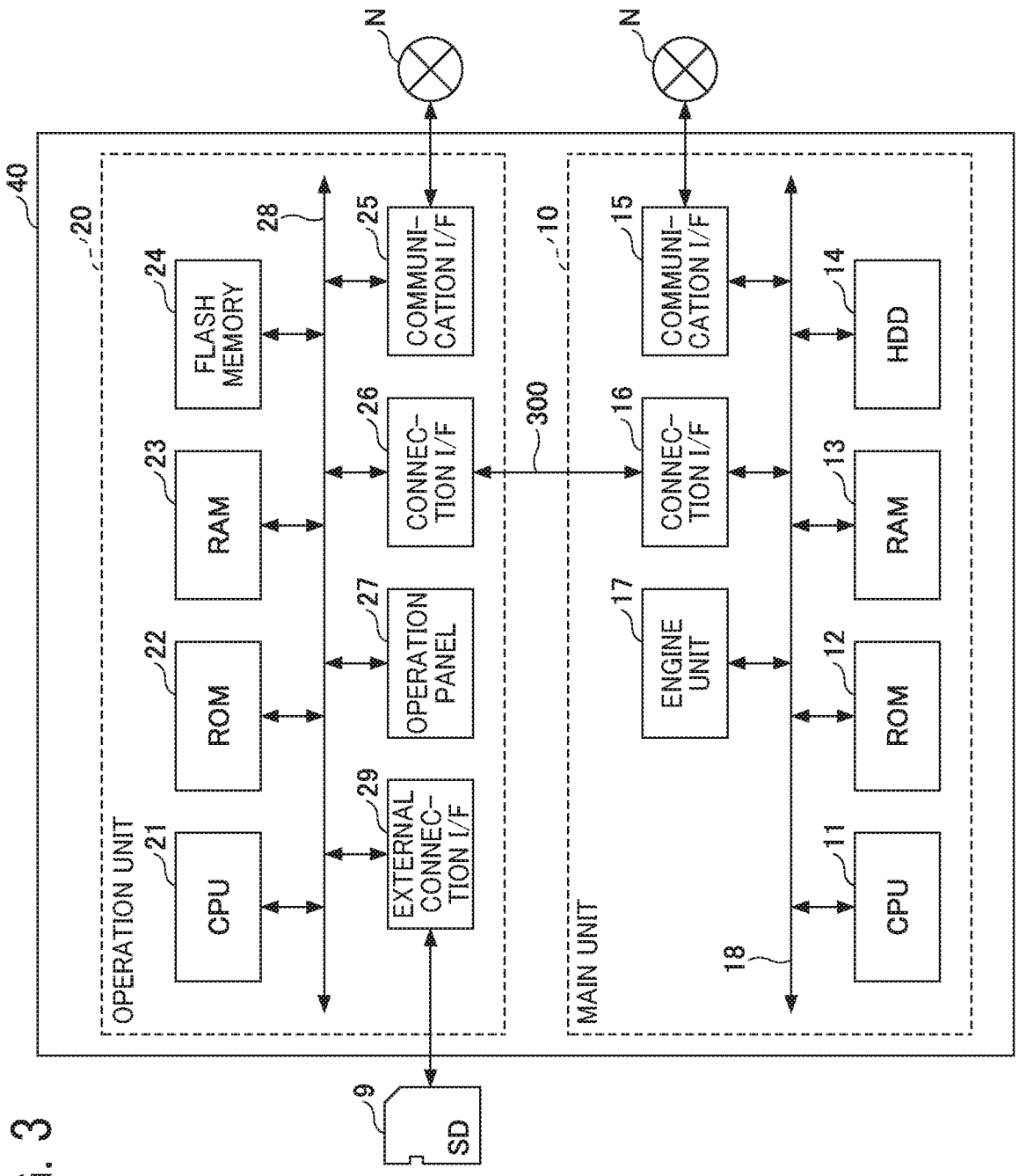
FIG. 3 illustrates an example of a hardware block diagram of an electronic apparatus used in the setting information handling system of FIG. 1.

Hardware Configuration of Electronic Apparatus:

FIG. 3 illustrates an example of a hardware block diagram of the electronic apparatus 40 (e.g., first electronic apparatus 40-1, second electronic apparatus 40-2). As illustrated in FIG. 3, the electronic apparatus 40 includes, for example, a main unit 10, and an operation unit 20. The main unit 10 and the operation unit 20 are connected to each other through a dedicated communication path 300. The communication path 300 can use any standard, such as a universal serial bus (USB) standard by using wired and/or wireless communication.

The main unit 10 can perform processing in accordance with an operation received at the operation unit 20. Further, the main unit 10 can also communicate with an external apparatus such as a client personal computer (PC), and can perform processing in accordance with an instruction received from the external apparatus.

Hereinafter, a description is given of a hardware configuration of the main unit 10. As illustrated in FIG. 3, the main unit 10 includes, for example, a central processing unit (CPU) 11, a read only memory (ROM) 12, a random access memory (RAM) 13, a hard disk drive (HDD) 14, a communication interface (I/F) 15, a connection I/F 16, and an engine unit 17, which are connected to each other via a system bus 18. For the convenience of description, in FIG. 3, the main unit 10 using a configuration having the HDD 14 is described. However, the main unit 10 may use a configuration not including the HDD 14, in which the storage capacity may become smaller.

The CPU 11 controls processing of the main unit 10 entirely. By executing one or more programs stored in the ROM 12 or HDD 14 using the RAM 13 as a working area by the CPU 11, the CPU 11 controls processing of the main unit 10 entirely to implement various functions such as copier function, scanner function, facsimile function, and printer function.

The communication I/F 15 is an interface used for connecting with the network N. The connection I/F 16 is an interface used for communicating with the operation unit 20 via the communication path 300.

The engine unit 17 is one or more hardware resources used for performing processing other than general-purpose information processing and communication processing, such as copy function, scanner function, facsimile function, and printer function. For example, the engine unit 17 includes a scanner (image scanning unit) that scans document image, a plotter (image forming unit) that prints images on sheets such as paper, and a facsimile unit that performs facsimile communication. Further, the engine unit 17 may include, for example, a finisher that finishes printed sheets, and an automatic document feeder (ADF) that automatically feeds documents as options.

Hereinafter, a description is given of a hardware configuration of the operation unit 20. As illustrated in FIG. 3, the operation unit 20 includes, for example, a CPU 21, a ROM 22, a RAM 23, a flash memory 24, a communication I/F 25, a connection I/F 26, an operation panel 27, an external connection I/F 29, and a system bus 28. For the convenience of description, in FIG. 3, the operation unit 20 uses a configuration having the flash memory 24, but the operation unit 20 may use a configuration not including the flash memory 24. In some cases, the electronic apparatus 40 may use a configuration not including a storage device that can store greater amount of data.

The recording medium 9 is a nonvolatile storage device such as a memory. The recording medium 9 may be a removable memory as described above. For example, the recording medium 9 may be a smart disk (SD) memory card (registered trademark), a universal serial bus (USB) memory, a compact Flash (registered trademark), a hard disk drive (HDD), and a solid state drive (SSD). The recording medium 9 can be any kind of recording media or storage media to which the first electronic apparatus 40-1 and the second electronic apparatus 40-2 can write information or read information.

Figure 4:
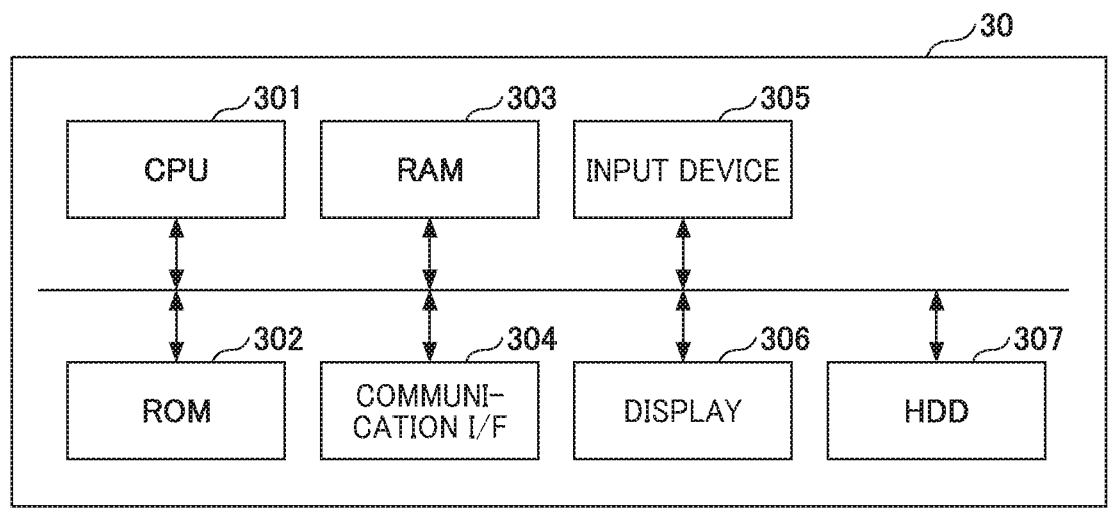
FIG. 4 illustrates an example of a hardware block diagram of a conversion server used in the setting information handling system of FIG. 1.

Conversion Server:

FIG. 4 is an example of a hardware block diagram of the conversion server 30. The conversion server 30 includes, for example, a CPU 301, a ROM 302, a RAM 303, a communication I/F 304, an input device 305, a display 306, and a hard disk drive (HDD) 307. The CPU 301 controls processing of the conversion server 30 entirely. The ROM 302 is a nonvolatile memory that stores various data such as programs. The RAM 303 is a volatile memory that functions as a working area when the CPU 301 executes various processing. The communication I/F 304 is an interface used for connecting with the network N. The input device 305 is a device used for inputting operations by a user, and includes, for example, a mouse and a keyboard. The display 306 is a device used for displaying various information, such as a liquid crystal display (LCD).

The hardware configuration of the terminal apparatus 60 may be the same as that of the conversion server 30, or may not be exactly the same without causing any problem.

As described above, the conversion server 30 preferably uses the cloud computing. Therefore, the hardware configuration illustrated in FIG. 4 is not required to be disposed in one housing or one apparatus, but the hardware configuration illustrated in FIG. 4 indicates the hardware resources used for the conversion server 30. Further, to devise the cloud computing for the conversion server 30, a physical configuration of the conversion server 30 is not a rigid configuration, but the hardware resources can be dynamically connected and disconnected depending on processing loads.

Functional Configuration:

FIGS. 5A and 5B illustrate an example of a functional block diagram of the setting information handling system 100 including the electronic apparatuses 40 and the conversion server 30. FIG. 5 illustrates a functional block diagram of one pattern that the electronic apparatus 40 transmits the setting information 8 to the conversion server 30.

In this description, the functions of the first electronic apparatus 40-1 and the second electronic apparatus 40-2 may be the same or different without causing any problem. Therefore, the first electronic apparatus 40-1 is mainly described in this description.

First Electronic Apparatus/Second Electronic Apparatus:

As illustrated in FIG. 5, the first electronic apparatus 40-1 includes, for example, a display/operation unit 41, a setting data transmitting unit 42, a setting data receiving unit 43, a setting data acquiring unit 44, a setting data setting unit 45, a basic function unit 46, and a storage unit 49. The display/operation unit 41 is implemented by the operation unit 20. The display/operation unit 41 is a functional unit or means that is implemented by operating at least one of the components illustrated in FIG. 3 under an instruction from the CPU 21 when the CPU 21 executes one or more programs loaded to the RAM 23 from the flash memory 24. The program is distributed from a program distribution server or distributed in a state stored in the recording medium 9.

On the other hand, the setting data transmitting unit 42, the setting data receiving unit 43, the setting data acquiring unit 44, the setting data setting unit 45, and the basic function unit 46 are functional units or means implemented by using at least any of the components illustrated in FIG. 3 under an instruction from the CPU 11 when the CPU 11 executes one or more programs loaded to the RAM 13 from the HDD 4. The program is distributed from a program distribution server or distributed in a state stored in the recording medium 9. These functional units may be implemented in any one of the main unit 10 and the operation unit 20, or both.

The display/operation unit 41 displays various screens on the operation panel 27, and receives operations of a CE or user performed, for example, on the operation panel 27.

The basic function unit 46 is used to provide one or more basic functions of the first electronic apparatus 40-1. In a case that the first electronic apparatus 40-1 is a multifunctional apparatus, the basic function unit 46 provides multiple functions such as printing, scanning document, and transmitting and receiving facsimile. Further, the basic function unit 46 acquires the setting information 8 from the storage unit 49 and writes the setting information 8 to the storage unit 49 based on a model profile 7. The basic function unit 46 is implemented when the CPU 11 executes one or more programs and controls the engine unit 17. The functions of the basic function unit 46 are to be described with reference to FIG. 6.

The setting data acquiring unit 44 acquires the setting information 8 from the basic function unit 46. The setting data acquiring unit 44 is a functional unit mainly used in the first electronic apparatus 40-1. The setting data acquiring unit 44 is implemented by executing one or more programs using the CPU 11. Further, the setting data acquiring unit 44 encrypts a set value of each setting item in the setting information 8 when the encryption is specified by the model profile 7.

The setting data transmitting unit 42 transmits the setting information 8, acquired by the setting data acquiring unit 44, to the conversion server 30 via the network N. The setting data transmitting unit 42 is a functional unit mainly used in the first electronic apparatus 40-1. The setting data transmitting unit 43 is implemented when the CPU 11 executes one or more programs and controls the communication I/F 15.

The setting data receiving unit 43 receives the setting information 8 from the conversion server 30 via the network N, and transmits the setting information 8 to the setting data setting unit 45. The setting data receiving unit 43 is a functional unit mainly used in the second electronic apparatus 40-2. The setting data receiving unit 43 is implemented when the CPU 11 executes one or more programs and controls the communication I/F 15.

The setting data setting unit 45 transmits the setting information 8, received via the setting data receiving unit 43, to the basic function unit 46. The setting data setting unit 45 is a functional unit mainly used in the second electronic apparatus 40-2. Further, the setting data setting unit 45 decodes the set value of each setting item in the setting information 8 when specified by the model profile 7. The setting data setting unit 45 is implemented by executing one or more programs using the CPU 11. Further, the first electronic apparatus 40-1 includes, for example, the storage unit 49. The storage unit 49 is a unit for storing information, which is implemented by one or more of the HDD 14, RAM 13, and ROM 12 of the main unit 10. The storage unit 49 stores the setting information 8, and other information, such as the model profile 7, one or more programs, documents, and log information.

TABLE 1

Address data
Preference data
Memory data
Service setting data

Table 1 is an example of the setting information 8. The setting information 8 includes information classified into, for example, four types such as the address data 8d, preference 8a, memory data 8b, and service setting data 8c (FIG. 1). The address data 8d indicates information related to a contact such as telephone number, facsimile number, and e-mail address of each user. The preference 8a indicates data set by a user. The preference 8a includes, for example, various setting items, such as a print position of header and footer used for describing page number and date, a transition time to shift to an energy saving mode, a set value related to a recording method of a debug log, and a set value designating the order of sheet feed trays to be used preferentially. The memory data 8b indicates data stored in the RAM 13 and the RAM 23 of the electronic apparatus 40. The memory data 8b further includes, for example, binary data. The binary data indicates data other than text data. The text data is interpretable in the same way by any model of the electronic apparatus 40 while the binary data becomes effective data when the binary data can be interpreted by a specific model of the electronic apparatus 40, such as the first electronic apparatus 40-1 (e.g., each application) The service setting data 8c indicates, for example, information related to an engine having a printing function, such as a set value that affects image quality including a set value of bias voltage, a set value of printing process speed, a set value of density, and a set value of fixing temperature. The service setting data 8c includes one or more set values that can be set by a CE.

TABLE 2

| Module ID | Preference ID | Acquisition Availability | Encryption Availability |
| --- | --- | --- | --- |
| 0 x 10000005 | 0 x 00000009 | YES | YES |
| 0 x 10000005 | 0 x 0000000A | YES | NO |
| 0 x 10000005 | 0 x 0000004F | NO | NO |
| 0 x 10000005 | 0 x 0000004C | YES | NO |
| — | — | — | — |

Table 2 is an example of the model profile 7, which is prepared for each model of the electronic apparatus 40. The model profile 7 specifies or designates whether each setting item of the setting information 8 is acquired and encrypted. In Table 2, modules indicate functions implemented by the electronic apparatus 40, such as print application, scanner application, and facsimile application. The preference ID is identification information of each setting item in each module. The "preference" of the preference ID means not only the preference 8a, which is one type of setting information, but also the setting item in a broader meaning. That is, the preference ID is also assigned to the memory data 8b or the like.

The module ID is identification information identifying a specific module, and the preference ID is identification information identifying a specific preference. The ID is abbreviation of identification, and it means identifier or identification information. The ID uses, for example, a name, a sign, a string of characters, a numerical value, or a combination of one or more of these for uniquely distinguishing a specific target from a plurality of targets. Other IDs is set same as the module ID.

The acquisition availability indicates whether a setting item identified by the preference ID is included in the setting information 8. For example, counter information indicating the number of pages printed by the first electronic apparatus 40-1 in the past is not used in the second electronic apparatus 40-2, and thereby the counter information of the first electronic apparatus 40-1 is not acquired by the second electronic apparatus 40-2. Further, if an apparatus ID (i.e., identification information of electronic apparatus) of the first electronic apparatus 40-1 is set in the second electronic apparatus 40-2, it may be determined that the second electronic apparatus 40-2 replaces the first electronic apparatus 40-1 and thereby the apparatus ID of the first electronic apparatus 40-1 is not acquired by the second electronic apparatus 40-2. The encryption availability specifies whether a setting item identified by the preference ID is to be encrypted. The encryption is performed for the setting item having highly sensitive information. For example, an administrator password (included in memory data 8 *b*), and the address data 8*d* are the encryption targets.

The model profile 7 may be distributed from the conversion server 30 to the first electronic apparatus 40-1 or the first electronic apparatus 40-1 may read the model profile 7 from the recording medium 9.

Conversion Server:

As illustrated in FIG. 5, the conversion server 30 includes, for example, a setting data input/output unit 31, an input data conversion unit 32, a model-to-model conversion unit 33, an output data conversion unit 34, and a user interface (UI) unit 35. Each of these functional units of the conversion server 30 is a functional unit or means implemented by operating any of the components illustrated in FIG. 4 under an instruction from the CPU 301 when the CPU 301 executes one or more programs loaded to the RAM 303 from the HDD 307. The program may be distributed from a program distribution server or distributed in a state stored in the recording medium 9.

The setting data input/output unit 31 transmits and receives the setting information 8 with the first electronic apparatus 40-1 and the second electronic apparatus 40-2. The setting data input/output unit 31 uses a communication protocol of encrypted communication, such as hypertext transfer protocol secure (HTTPS) or HTTP 2.0. The setting data input/output unit 31 is implemented when the CPU 301 (FIG. 4) executes one or more programs and controls the communication I/F 304.

The input data conversion unit 32 converts the setting information 8 described in a format matched to the first electronic apparatus 40-1 into a format common to a plurality of models by referring to the data format conversion table 39*b* and the model-to-model conversion table 39*c* suitable for the model of the first electronic apparatus 40-1 stored in the table storage unit 39.

The model-to-model conversion unit 33 associates a conversion result of setting items (i.e., setting information), converted by the input data conversion unit 32, with the setting items of the second electronic apparatus 40-2 by referring to the model-to-model conversion table 39*c* suitable for the model of the second electronic apparatus 40-2.

The output data conversion unit 34 arranges the setting items of the setting information of the second electronic apparatus 40-2, associated with the conversion result by the model-to-model conversion unit 33, in accordance with a memory space of the second electronic apparatus 40-2, by referring to the data format conversion table 39*b* suitable for the model of the second electronic apparatus 40-2 stored in the table storage unit 39.

The input data conversion unit 32, the model-to-model conversion unit 33, and the output data conversion unit 34 are implemented by executing one or more programs using the CPU 301 (FIG. 4).

The memory data 8*b* and the service setting data 8*c* are converted by the input data conversion unit 32, the model-to-model conversion unit 33, and the output data conversion unit 34. The preference 8*a* is associated with the setting items by the model-to-model conversion unit 33. The address data 8*d* is not converted.

The UI unit 35 communicates with the terminal apparatus 60 using a communication protocol, such as HTTPS, and provides a function of a hypertext transfer protocol (HTTP) server that transmits screen information described in hypertext markup language (HTML) or JavaScript (registered trademark) to the terminal apparatus 60. The UI unit 35 is implemented by executing one or more programs using the CPU 301 (FIG. 4).

The conversion server 30 further includes, for example, a setting information storage unit 38, and a table storage unit 39 as illustrated in FIG. 5A. The setting information storage unit 38 and the table storage unit 39 are functional units or means for storing information, implemented by one or more of the HDD 307, RAM 303, and ROM 302 (FIG. 4). The setting information storage unit 38 stores the setting information 8, transmitted from the first electronic apparatus 40-1 and setting information management table (Table 6) used for managing the setting information 8. Further, the table storage unit 39 stores, for example, a user information management table 39*a*, the data format conversion table 39*b*, and the model-to-model conversion table 39*c*.

TABLE 3

| Area ID | Data type | Length | Offset | Module ID | Preference ID |
|---|---|---|---|---|---|
| 0 x 00000004 | 1 | 1 | 0 x 0000000D | 0 x 10000005 | 0 x 00000009 |
| 0 x 00000004 | 1 | 1 | 0 x 0000000E | 0 x 10000005 | 0 x 0000000A |
| 0 x 00000005 | 1 | 1 | 0 x 0000000A | 0 x 10000005 | 0 x 0000004F |
| 0 x 00000005 | 1 | 1 | 0 x 0000001F | 0 x 10000005 | 0 x 0000004C |
| 0 x 00000005 | 1 | 1 | 0 x 0000002E | 0 x 10000005 | 0 x 0000004D |
| 0 x 00000005 | 1 | 1 | 0 x 00000030 | 0 x 10000005 | 0 x 0000004E |
| 0 x 00000005 | 1 | 1 | 0 x 00000041 | 0 x 10000005 | 0 x 00000050 |
| 0 x 00000005 | 1 | 1 | 0 x 00000055 | 0 x 10000005 | 0 x 00000065 |
| 0 x 00000005 | 1 | 1 | 0 x 0000005D | 0 x 10000005 | 0 x 00000066 |

TABLE 3-continued

| Area ID | Data type | Length | Offset | Module ID | Preference ID |
|---|---|---|---|---|---|
| 0 x 00000005 | 1 | 1 | 0 x 000000AC | 0 x 10000005 | 0 x 00000036 |

Table 3 is an example of the data format conversion table 39b. The data format conversion table 39b is prepared in advance for each model of the electronic apparatus 40, and is used by the electronic apparatus 40 to acquire the setting information based on the memory space of the electronic apparatus 40, which is different model by model. The data format conversion table 39b includes, for example, area ID, data type, length, offset, module ID, and preference ID.

The area ID indicates a location of information, such as a storage location of a set value in the RAM 13 or the RAM 23, a storage location in a register, and other storage location. Once the storage location is determined, the acquisition method is determined.

The data type indicates identification information identifying a type of data. The details of data type are to be illustrated in Table 4.

The length indicates a length of a set value of a setting item, which is also referred to as data size.

The offset indicates a difference of address from the beginning (head) of address identified by the area ID to one set value.

The module ID and the preference ID are the same as in Table 2. Since a function is identified by the module ID, and a setting item in a module is identified by the preference ID, the module ID and the preference ID become identification information of the setting item in the electronic apparatus 40. The module ID is identification information of each specific module, and the preference ID is identification information in each specific module.

Based on the data format conversion table 39b (Table 3), each setting item of the electronic apparatus 40 is uniquely identified by the module ID and the preference ID, and an area storing each setting item is designated by the area ID. Then, a specific range within the area designated by the area ID, which is used for storing the set value, is identified by the offset and length. Since the data type of the setting item can be also identified, the conversion server 30 can determine a method of interpreting the data, expressed in the electronic apparatus 40, in the same manner as the electronic apparatus 40 interprets the data. The data format conversion table 39b is preferably included in not only the conversion server 30 but also each of the electronic apparatuses 40. This is because the data format conversion table 39b may be used when the electronic apparatus 40 decodes encrypted information and rearranges decrypted information, to be described later with reference to FIG. 19.

TABLE 4

| Data Type No. | Data Type |
|---|---|
| 0 | char |
| 1 | uchar |
| 2 | short |
| 3 | ushort |
| 4 | long |
| 5 | ulong |
| 6 | time_t |
| 7 | short_big |
| 8 | ushort_big |
| 9 | long_big |

TABLE 4-continued

| Data Type No. | Data Type |
|---|---|
| 10 | ulong_big |
| 11 | str |
| 12 | charcode_str |
| 13 | binary |

Table 4 is an example of the data type. The data type defines feature, bit number, and expression range of numerical value of data. For example, the data type defines character type, integer type, decimal type, and with/without sign.

TABLE 5

| Module ID | Preference ID | Common ID1 | Common ID2 |
|---|---|---|---|
| 0 x 10000005 | 0 x 00000009 | 0 x 10000005 | 0 x 10000009 |
| 0 x 10000005 | 0 x 0000000A | 0 x 10000005 | 0 x 1000000A |
| 0 x 10000005 | 0 x 0000004F | 0 x 10000005 | 0 x 10000100 |
| 0 x 10000005 | 0 x 0000004C | 0 x 10000005 | 0 x 1000004C |
| 0 x 10000005 | 0 x 0000004D | 0 x 10000005 | 0 x 1000004D |
| — | — | — | — |

Table 5 is an example of the model-to-model conversion table 39c. The model-to-model conversion table 39c is a table prepared in advance for each model of the electronic apparatus 40. The model-to-model conversion table 39c is used as a table associating setting items between different models. The model-to-model conversion table 39c includes, for example, module ID, preference ID, common ID1, and common ID2. Each of the common IDs 1 and 2 is identification information of the setting item common to all of models of the electronic apparatus 40. The common ID 1 corresponds to the module ID, and the common ID 2 corresponds to the preference ID. The common IDs 1 and 2 are managed by, for example, a manufacturer of the electronic apparatuses 40 to secure uniqueness of the common IDs 1 and 2 among all models of the electronic apparatus 40. The table storage unit 39 stores what information is set for each setting item in association with the common IDs 1 and 2. Since the contents of setting item identified by the common IDs 1 and 2 is managed, the contents of the setting item of the module ID and the preference ID associated with the common IDs 1 and 2 can be also identified. For example, it can be identified what set value is set for the setting item identified by the module ID and the preference ID of the first electronic apparatus 40-1.

Further, since the model-to-model conversion table 39c is prepared for each model, the module ID and the preference ID of the first electronic apparatus 40-1 are associated with the common IDs 1 and 2, and the same common IDs 1 and 2 are associated with the module ID and the preference ID of the second electronic apparatus 40-2. Therefore, the module ID and the preference ID of the first electronic apparatus 40-1 are associated with the module ID and the preference ID of the second electronic apparatus 40-2.

TABLE 6

| Apparatus ID | File of setting information | Time stamp | Comment |
|---|---|---|---|
| 3F55-11111 | .../3F55-11111/setting.cab | 2017/04/18/ 10:10 | Company A: Human resource Dept. |
| 3F55-22222 | .../3F55-22222/setting.cab | 2017/04/18/ 12:35 | Company A: Intellectual property Dept. |
| — | — | — | — |

Table 6 is an example of the setting information management table stored in the setting information storage unit 38. The setting information management table includes, for example, apparatus ID, file of setting information, time stamp, and comment associated with each other. The apparatus ID indicates identification information identifying a specific electronic apparatus. The apparatus ID includes, for example, a model and a machine number, and the apparatus ID can be used to identify each specific model of the apparatus, and each specific machine number in the same model. For example, when the apparatus ID is "3F55-11111," "3F55" corresponds to the model, and "11111" corresponds to the machine number of the apparatus. The file of setting information indicates a path and a file name of a file storing the setting information 8. The time stamp indicates date and time when the setting information 8 was generated. The comment indicates arbitrary information for the setting information 8, and may be information for managing or identifying the setting information 8 by a CE or user.

TABLE 7

| | |
|---|---|
| User ID | 12345678 |
| Password | ******* |
| Registration apparatus | 3F55-11111 |
| | 3F55-22222 |

Table 7 is an example of the user information management table 39a. The user information management table 39a is used for managing the electronic apparatus 40 used by a user, such as a customer. The user information management table 39a registers, for example, user ID, password, and registration apparatus. The user ID, identifying a user of the electronic apparatus 40, is used by the conversion server 30 when identifying the user of the electronic apparatus 40. The password is an administrator password to be referred to when a CE or user logs in. The registration apparatus indicates the apparatus ID of the electronic apparatus registered by the user. Thus, when the CE or user logs in, the first electronic apparatus 40-1 that is already in use is detected. After the second electronic apparatus 40-2 is registered, the second electronic apparatus 40-2 can be confirmed by the CE or user. In this example case, the user may be a company using the electronic apparatuses 40 or a tenant (e.g., corporation, e or department of corporation) using the conversion server 30.

Figure 6:
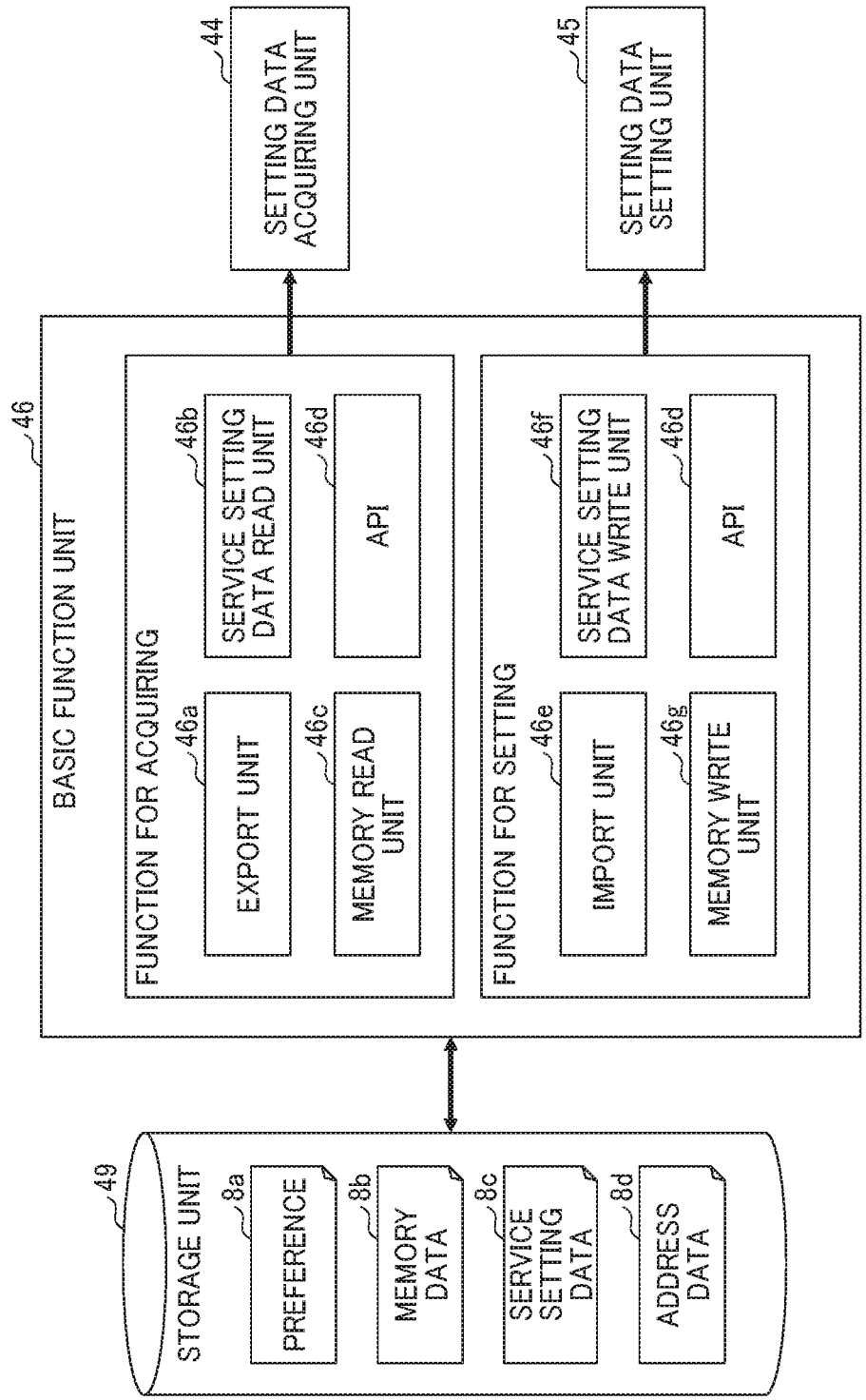
FIG. 6 illustrates an example of a functional block diagram of a basic function unit of the electronic apparatus used in the setting information handling system of FIG. 1.

Function of Basic Function Unit:

FIG. 6 is an example of a functional block diagram of the basic function unit 46. The basic function unit 46 includes, for example, a function for acquiring the setting information, and a function for setting the setting information. As illustrated in FIG. 6, the acquiring function of the basic function unit 46 includes, for example, an export unit 46a, a service setting data read unit 46b, a memory read unit 46c, and an application interface (API) 46d. Each functional unit is configured to acquire corresponding data in the setting information 8 from the setting information 8 stored in the storage unit 49. The export unit 46a acquires the preference 8a from the storage unit 49. The memory read unit 46c acquires the memory data 8b from the storage unit 49. The service setting data read unit 46b acquires the service setting data 8c from the storage unit 49. The API 46d acquires the address data 8d from the storage unit 49. The API is an interface that is used by the basic function unit 46 to request processing to an application and to acquire a process result from the application, in which the API is a functional unit to call the application. Some of the setting information is managed by the application, and such setting information is acquired and set via the application.

As illustrated in FIG. 6, the setting function of the basic function unit 46 includes, for example, an import unit 46e, a service setting data write unit 46f, a memory write unit 46g, and the API 46d. Each functional unit is configured to write corresponding data of the setting information 8 in the storage unit 49 to store the setting information 8 in the storage unit 49. The import unit 46e writes the preference 8a to the storage unit 49. The memory write unit 46g writes the memory data 8b to the storage unit 49. The service setting data write unit 46f writes the service setting data 8c to the storage unit 49. The API 46d writes the address data 8d to the storage unit 49.

Figure 7A:
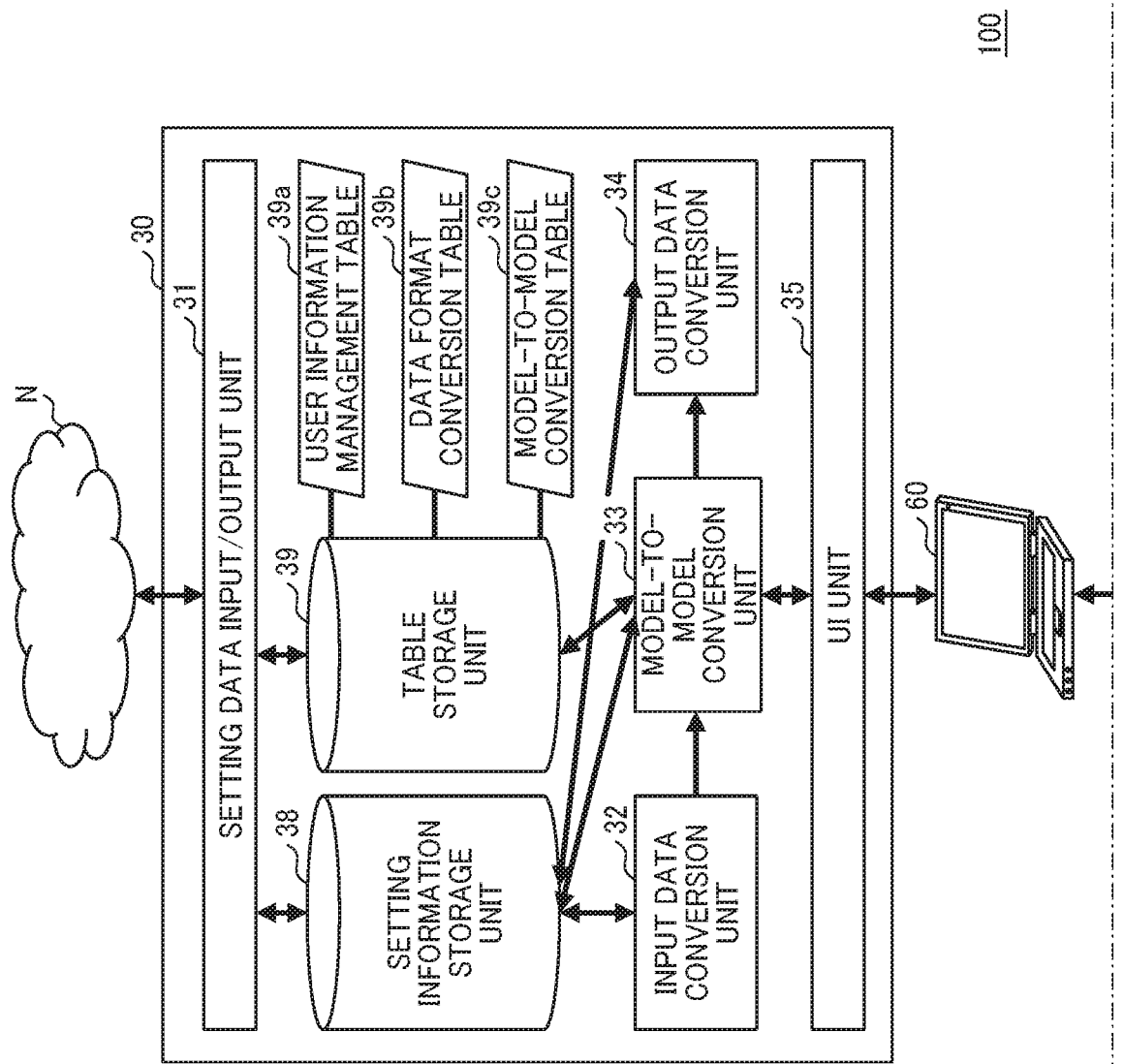
FIGS. 7A and 7B illustrate another example of a functional block diagram of the setting information handling system including the electronic apparatus and the conversion server.
Figure 7B:
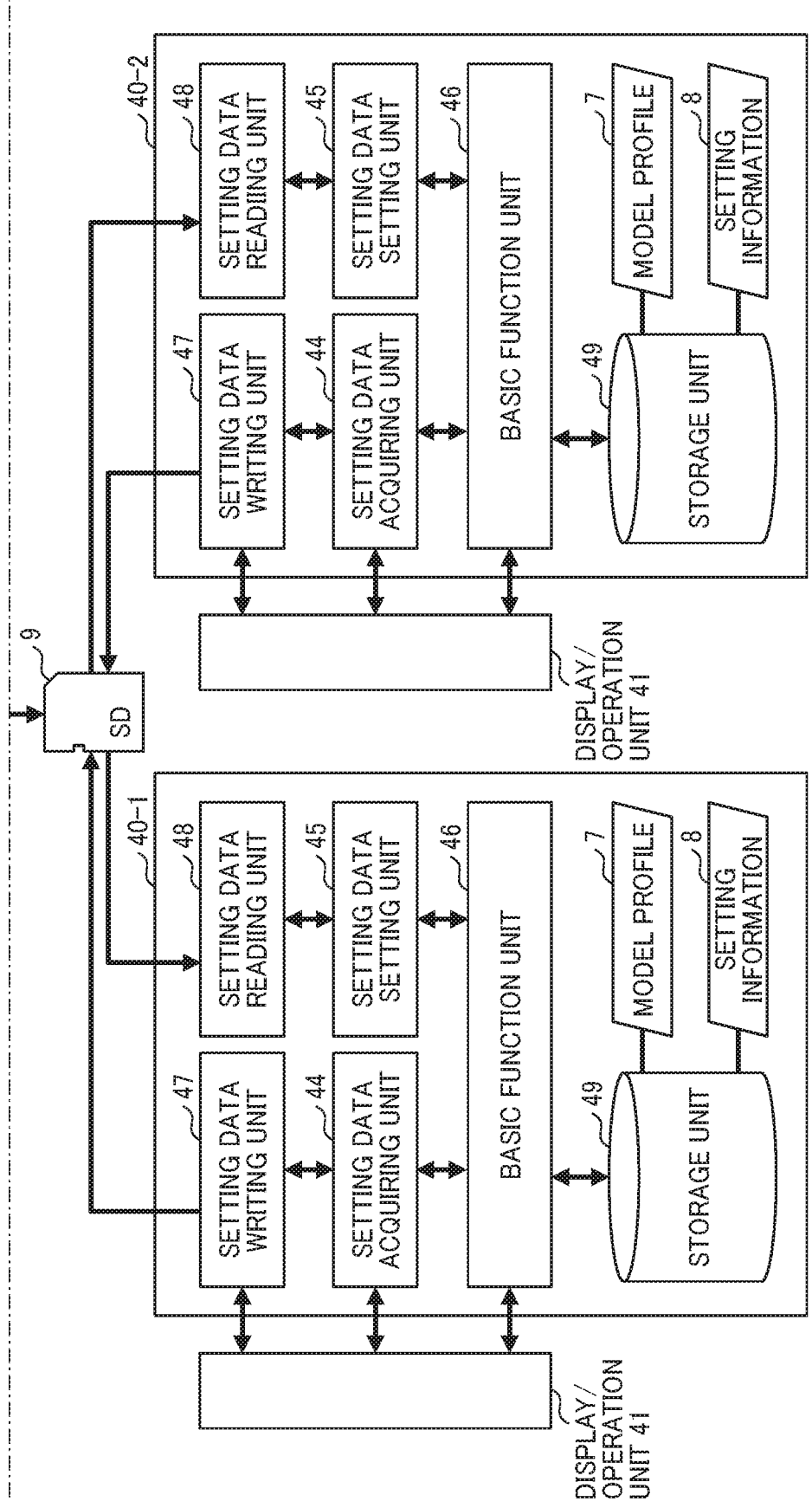

Configuration Using Storage Medium:

FIGS. 7A and 7B illustrate another example of a functional block diagram of the setting information handling system 100 including the electronic apparatus 40 and the conversion server 30. FIG. 7 is a functional block diagram used in another pattern when the electronic apparatus 40 writes the setting information 8 to the recording medium 9 used as a storage medium. The description of FIG. 7 mainly describes the difference with respect to FIG. 5.

In FIG. 7, each of the first electronic apparatus 40-1 and the second electronic apparatus 40-2 includes a setting data writing unit 47, and a setting data reading unit 48. The setting data writing unit 47 writes the setting information 8 to the recording medium 9. The setting data writing unit 47 is mainly used in the first electronic apparatus 40-1. The setting data reading unit 48 reads the setting information 8 from the recording medium 9. The setting data reading unit 48 is mainly used in the second electronic apparatus 40-2. The setting data writing unit 47 and the setting data reading unit 48 are implemented when the CPU 11 executes one or more programs and controls the external connection I/F 29.

In a configuration of FIG. 7, the terminal apparatus 60 transmits the setting information 8 stored in the recording medium 9 to the conversion server 30, then the terminal apparatus 60 receives the converted setting information 8 from the conversion server 30, and stores the converted setting information 8 in the recording medium 9. Therefore, the function of the conversion server 30 of FIG. 7 can be similar to that of the conversion server 30 of FIG. 5.

Figure 8:
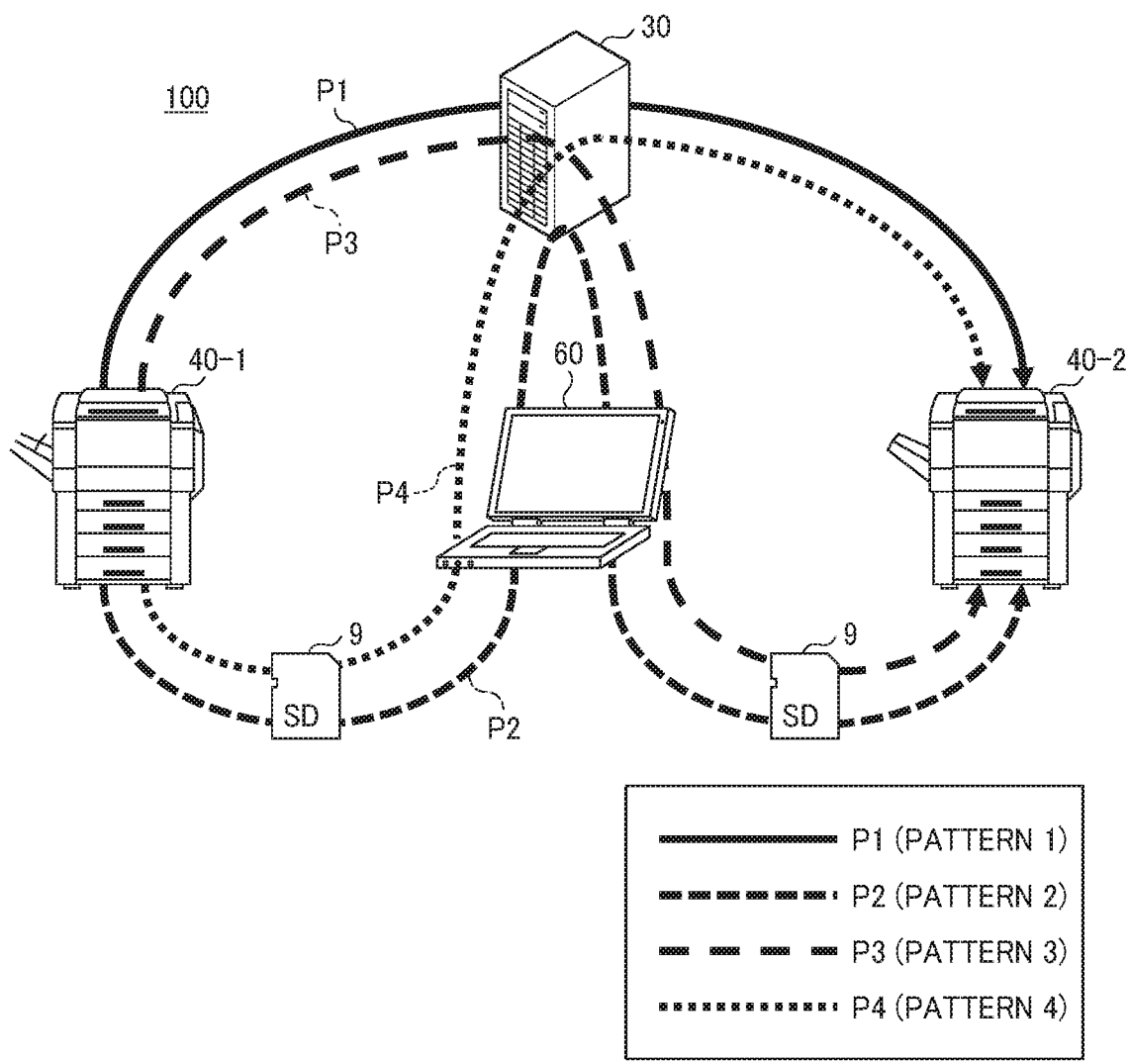
FIG. 8 illustrates an example of patterns when setting information is set in the setting information handling system.

Setting Pattern of Setting Information:

FIG. 8 illustrates an example of patterns when the setting information 8 is set in the setting information handling system 100.

Pattern 1 (P1): first electronic apparatus 40-1→conversion server 30→second electronic apparatus 40-2

Pattern 2 (P2): first electronic apparatus 40-1→recording medium 9→terminal apparatus 60→conversion server 30→terminal apparatus 60→recording medium 9→second electronic apparatus 40-2

Pattern 3 (P3): first electronic apparatus 40-1→conversion server 30→terminal apparatus 60→recording medium 9→second electronic apparatus 40-2

Pattern 4 (P4): first electronic apparatus 40-1→recording medium 9→terminal apparatus 60→conversion server 30→second electronic apparatus 40-2

The patterns 1 and 2 may be used mainly. If a CE or user is in a network environment having insufficient communication bandwidth, or if the company rule prohibits to store the setting information 8 in the conversion server 30, the pattern 2 may be selected. Further, the pattern 2 may be selected if the transmission time to the conversion server 30 is predicted to be longer due to a greater size of the address data 8d. Otherwise, the pattern 1 may be selected. But other patterns can be selected as needed.

Further, if the situation changes during the export and the import, the pattern 3 or pattern 4 can be selected.

Further, in the embodiment, the setting information 8 is stored in the recording medium 9 when exporting and importing, but the first electronic apparatus 40-1 can be configured to directly transmit the setting information 8 to the terminal apparatus 60, and the second electronic apparatus 40-2 can be configured to receive the setting information 8 directly from the terminal apparatus 60.

Example of Conversion:

Hereinafter, a description is given of a conversion of setting information using the data format conversion table 39b and the model-to-model conversion table 39c with reference to FIGS. 9 to 11.

Figure 9B:
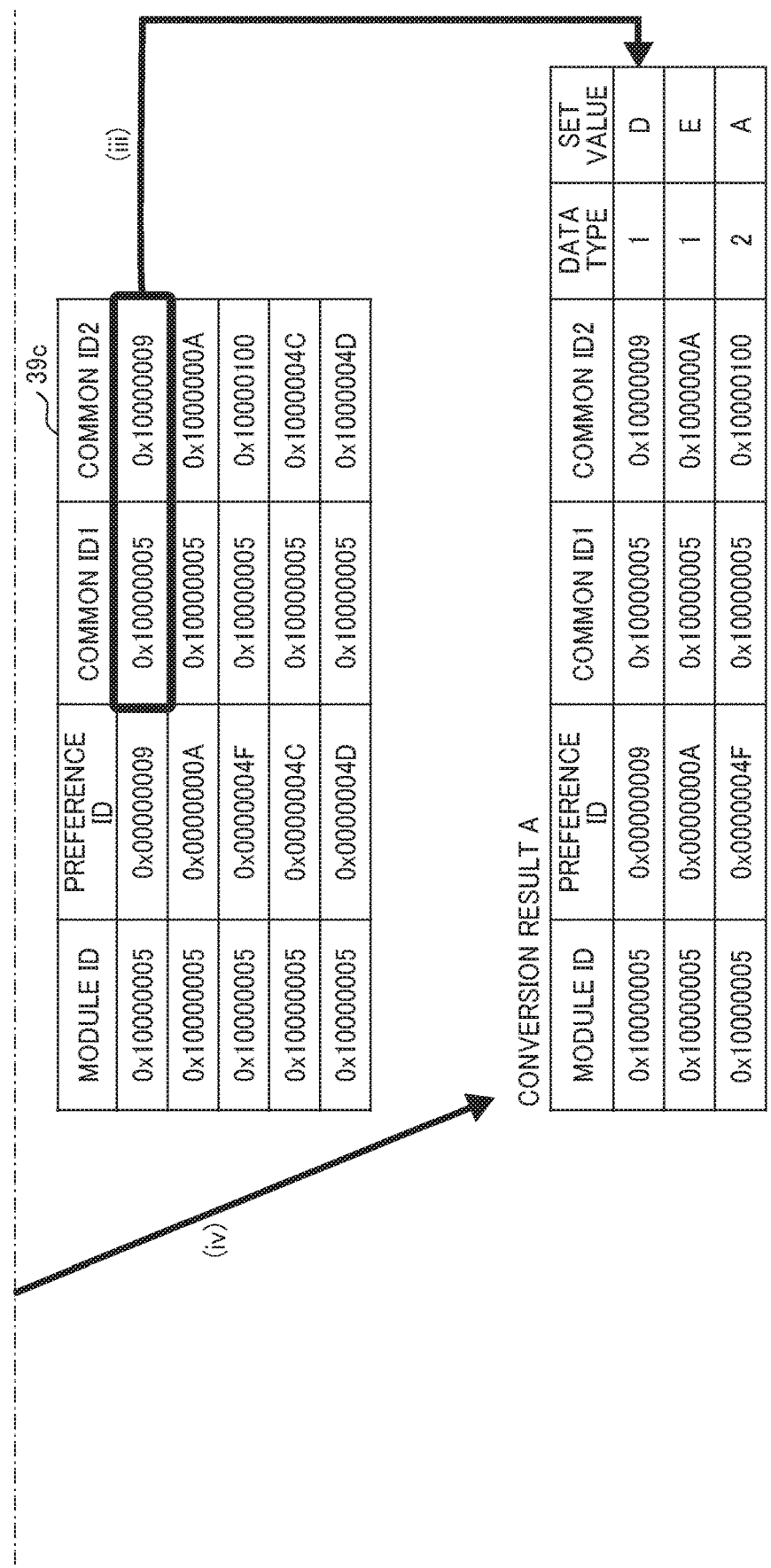

FIGS. 9A and 9B schematically illustrate a process of converting the setting information of the first electronic apparatus 40-1 into the setting information common to the models of the electronic apparatus 40 using the model-to-model conversion table 39c and the data format conversion table 39b suitable for the model of the first electronic apparatus 40-1 by using the input data conversion unit 32. In an example of FIG. 9, the conversion of the memory data 8b is described. The conversion of the service setting data 8c is also performed similar to the conversion of the memory data 8b, which is to be described in detail later with reference to FIGS. 17 and 18. In FIG. 9, the memory data 8b is, for example, binary data. The storage location of the setting information is identified by the area ID, the beginning (head) of the set value is identified by the offset, the length of the set value is identified by the data size, and the interpretation method is identified by the data type.

(i) The input data conversion unit 32 refers to the data format conversion table 39b suitable for the model of the first electronic apparatus 40-1 to determine a module ID and a preference ID. Then, the storage location of the memory data 8b is identified by the area ID associated with the determined module ID and the preference ID.

(ii) By shifting the position from the beginning (head) of the memory data 8b by applying the offset defined in the data format conversion table 39b, one set value corresponding to the length is read in accordance with the data type.

(iii) The input data conversion unit 32 refers to the model-to-model conversion table 39c suitable for the model of the first electronic apparatus 40-1 to read out the common IDs 1 and 2 associated with the module ID and the preference ID.

(iv) The input data conversion unit 32 generates a conversion result A including the set value read from the memory data 8b, the module ID, the preference ID, the common IDs 1 and 2, and the data type.

In FIG. 9, letters of "A, B, C, D, E, F are set in the memory data 8b. However, each letter of "A, B, C, D, E, F" does not indicate the corresponding character, but each letter indicates one set value. In FIG. 9, "A, C, D, E" are inverted to indicate that each set value is acquired using the model profile 7. In other words, "B" and "F" are not acquired using the model profile 7 because "B" and "F" are, for example, counter information of the first electronic apparatus 40-1.

By performing the above described processing, as illustrated in of FIG. 9, the conversion result A associating the module ID, the preference ID, the common IDs 1 and 2, the data type, and the set value is generated. Since the set value of the first electronic apparatus 40-1 is acquired together with the contents (e.g., common IDs 1 and 2) and the interpretation method (e.g., data type), the conversion result A becomes the setting information described in a format common to a plurality of models that can be viewed from, for example, the terminal apparatus 60.

FIGS. 10A and 10B illustrate an example of a conversion result B, which is generated using the conversion result A and the model-to-model conversion table 39c suitable for the model of the second electronic apparatus 40-2. The conversion result B includes the setting information generated by associating the conversion result A and the model-to-model conversion table 39c suitable for the second electronic apparatus 40-2.

(i) The model-to-model conversion unit 33 retrieves or searches the common IDs 1 and 2, which are the same common IDs 1 and 2 set in the conversion result A, from the model-to-model conversion table 39c suitable for the model of the second electronic apparatus 40-2.

(ii) The model-to-model conversion unit 33 reads out a module ID and a preference ID, associated with the common IDs 1 and 2 in the model-to-model conversion table 39c suitable for the model of the second electronic apparatus 40-2.

(iii) The model-to-model conversion unit 33 reads out the common IDs 1 and 2 in the model-to-model conversion table 39c suitable for the model of the second electronic apparatus 40-2.

(iv) The model-to-model conversion unit 33 reads out the data type and the set value associated with the common IDs 1 and 2 from the conversion result A. Then, the model-to-model conversion unit 33 generates the conversion result B by associating the module ID, the preference ID, and the common IDs 1 and 2 of the model-to-model conversion table 39c suitable for the model of the second electronic apparatus 40-2, with the set value and the data type read from the conversion result A.

By generating the conversion result B, each setting item of the setting information 8 of the first electronic apparatus 40-1 is associated with the setting item of the second electronic apparatus 40-2. Further, the conversion result B can be also referred to as the setting information described in the format common to a plurality of models.

FIG. 11 illustrates an example of converting the conversion result B into the setting information 8 described in a format matched to the second electronic apparatus 40-2 using the data format conversion table 39b suitable for the model of the second electronic apparatus 40-2.

(i) The output data conversion unit 34 retrieves or searches the module ID and the preference ID set in the conversion result B from the data format conversion table 39b suitable for the model of the second electronic apparatus 40-2.

(ii) The output data conversion unit 34 identifies a target storage location of the memory data 8b based on the area ID associated with the module ID and the preference ID searched from the data format conversion table 39*b* suitable for the model of the second electronic apparatus 40-2.

(iii) The output data conversion unit 34 shifts a position from the beginning (head) of the memory data 8*b* by applying the offset defined in the data format conversion table 39*b* suitable for the model of the second electronic apparatus 40-2, and arranges the set value having the length in accordance with the data type.

In an example of FIG. 11, the set value "A" having the module ID of "0x10000005" and the preference ID of "0x1000000B" is written as one-byte data at the position of "0x00000030," which is offset from the beginning (head) of the area ID of "0x00000005." As indicated in the memory data 8*b* of FIG. 11 compared to the memory data 8*b* of FIG. 9, the storage location of the set value "A" in the memory data 8*b* is changed in FIG. 11.

As described above, the setting information described in the format matched to the first electronic apparatus 40-1 is changed to the setting information described in the common format, and then the setting information described in the common format is changed to the setting information described in the format matched to the second electronic apparatus 40-2. Therefore, the conversion server 30 can convert the memory data 8*b*, the service setting data 8*c* into the data described in the format matched to the second electronic apparatus 40-2 even if the memory space, the storage location, and the data type are changed between the setting information 8 of the first electronic apparatus 40-1 and the setting information 8 of the second electronic apparatus 40-2. With this configuration, the manual workloads of CE or user after importing the setting information 8 can be reduced.

Sequence of Operation:

Hereinafter, a description is given of an operation of the setting information handling system 100. The operation of the setting information handling system 100 using the pattern 1 is described as below.

Figure 12:
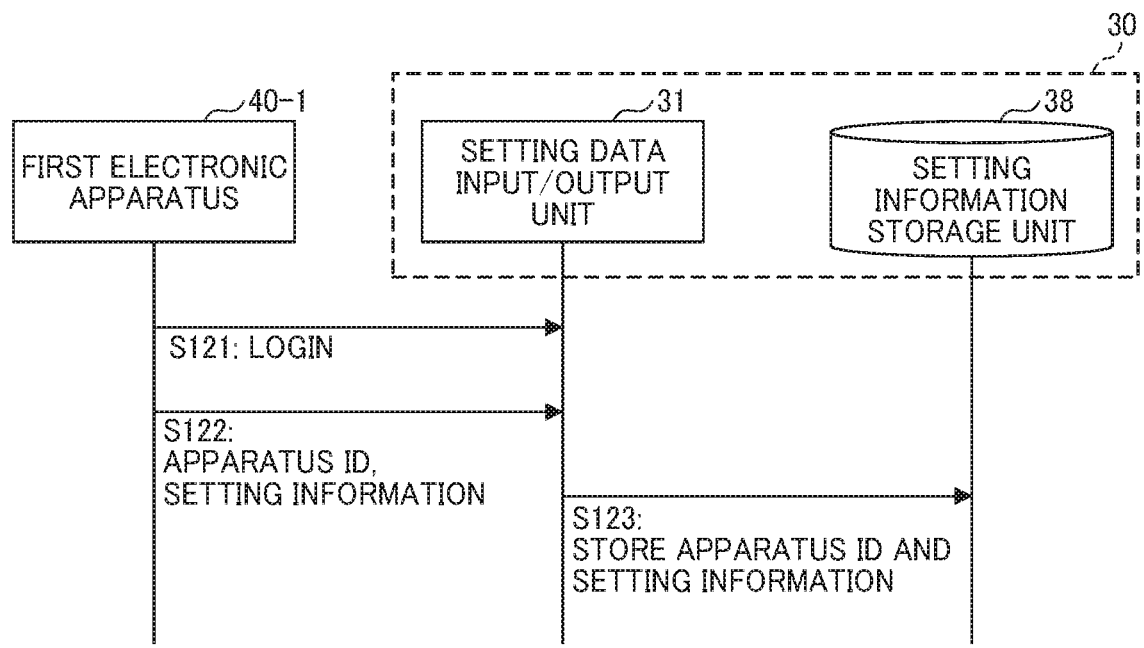
FIG. 12 illustrates an example of a sequence diagram of a procedure when the first electronic apparatus transmits setting information to the conversion server.

Export:

FIG. 12 illustrates an example of a sequence diagram of a procedure when the first electronic apparatus 40-1 transmits the setting information 8 to the conversion server 30 using the pattern 1 indicated in FIG. 8.

S121: When the display/operation unit 41 of the first electronic apparatus 40-1 receives a login ID and a password from a CE or user, the setting data transmitting unit 42 transmits a login request to the conversion server 30. In this example case, it is assumed that the CE or user logs in successfully.

S122: Then, the setting data acquiring unit 44 of the first electronic apparatus 40-1 acquires the setting information 8 from the basic function unit 46, and then the setting data transmitting unit 42 transmits the setting information 8 to the conversion server 30 with the apparatus ID of the first electronic apparatus 40-1.

S123: Then, the setting data input/output unit 31 of the conversion server 30 receives the apparatus ID and the setting information 8, and stores the apparatus ID and the setting information 8 by associating each other in the setting information storage unit 38. In this example case, a time stamp is attached as metadata of the setting information 8, and the comment is discretionally set by the CE or user. The apparatus ID can be used to identify at least the model of the electronic apparatus 40.

Conversion Processing:

Hereinafter, a description is given of a procedure of converting the setting information 8 in the setting information handling system 100 with reference to FIGS. 13 to 15.

Figure 13:
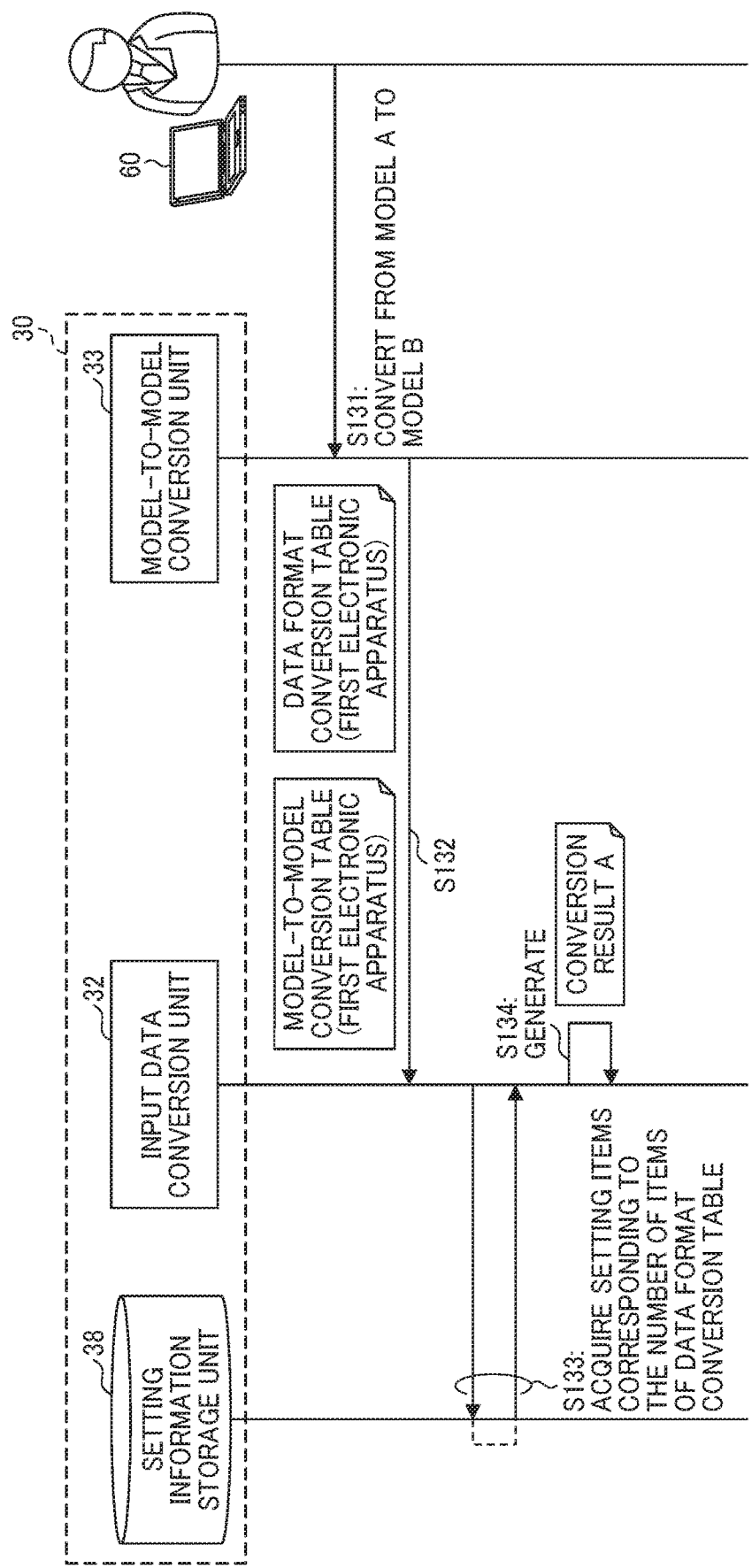
FIG. 13 illustrates an example of a sequence diagram of a process of generating conversion result A from setting information of the first electronic apparatus.

FIG. 13 illustrates an example of a sequence diagram of a process of generating the conversion result A from the setting information 8 of the first electronic apparatus 40-1. In this example case, the setting information 8 is already transmitted from the first electronic apparatus 40-1 to the conversion server 30.

S131: A CE or user operates the terminal apparatus 60 to input an instruction for converting the setting information 8 of the first electronic apparatus 40-1 (e.g., model A) into the setting information 8 of the second electronic apparatus 40-2 (e.g., model B) to the UI unit 35. The UI unit 35 notifies this instruction to the model-to-model conversion unit 33. The CE or user instructs at least the model of the first electronic apparatus 40-1 and the model of the second electronic apparatus 40-2. Further, the model can be identified based on the apparatus ID or the like.

S132: The model-to-model conversion unit 33 reads out the data format conversion table 39*b* and the model-to-model conversion table 39*c* suitable for the model of the first electronic apparatus 40-1 stored in the table storage unit 39, and transmits the data format conversion table 39*b* and the model-to-model conversion table 39*c* suitable for the model of the first electronic apparatus 40-1 to the input data conversion unit 32.

S133: The input data conversion unit 32 refers to the data format conversion table 39*b* and the model-to-model conversion table 39*c* suitable for the model of the first electronic apparatus 40-1 to read out the set value from the setting information 8 for each setting item.

S134: As described with reference to FIG. 9, the input data conversion unit 32 acquires the module ID and the preference ID set in the data format conversion table 39*b* suitable for the model of the first electronic apparatus 40-1 the area ID, the offset, and the data type, and reads out the set value based on these information, and then acquires the common IDs 1 and 2 set in the model-to-model conversion table 39*c* to generate the conversion result A.

The input data conversion unit 32 repeats the processing until all of the setting items of the data format conversion table 39*b* suitable for the model of the first electronic apparatus 40-1 are processed completely to generate the conversion result A.

Figure 14:
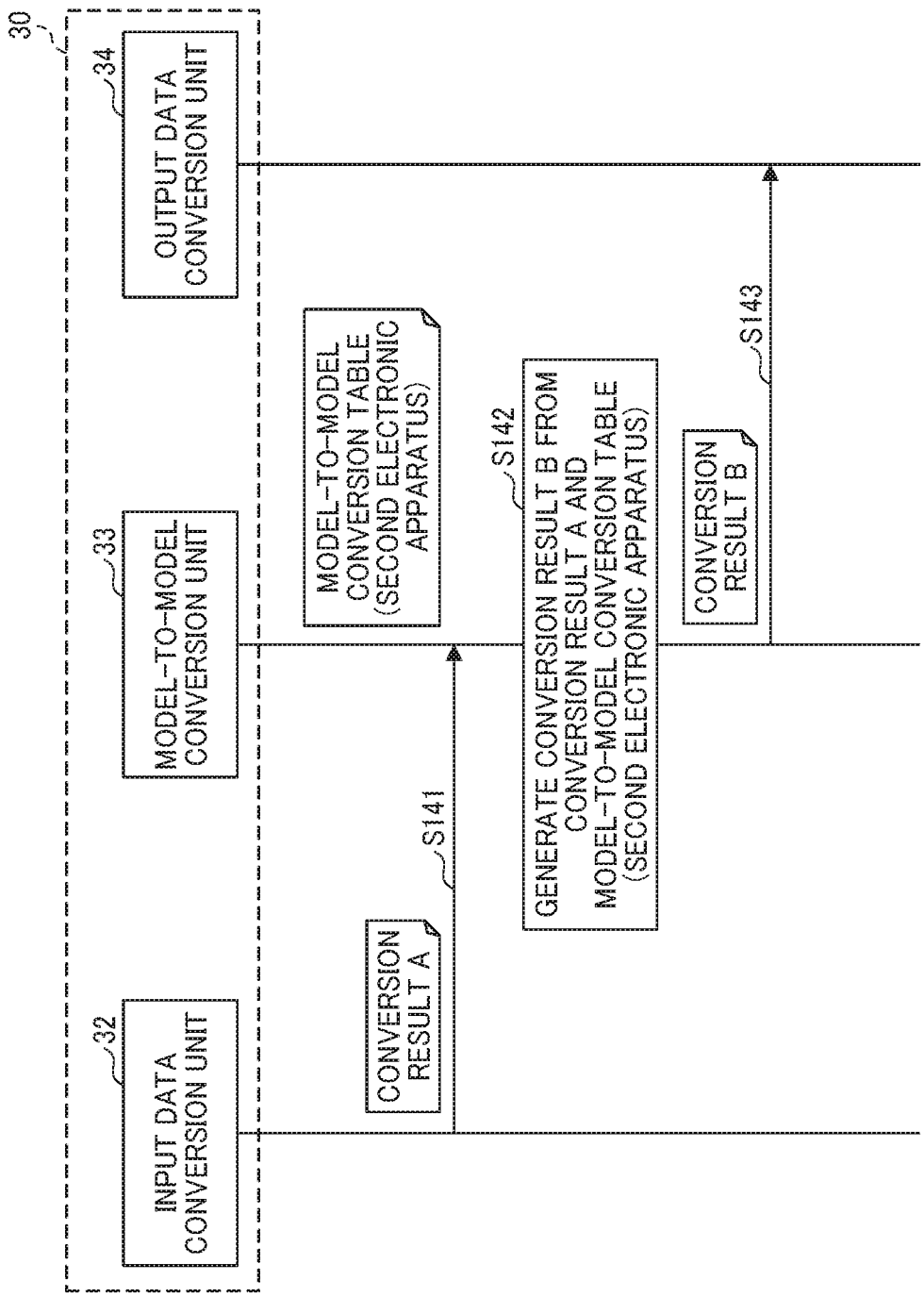
FIG. 14 illustrates an example of a sequence diagram of a procedure when a model-to-model conversion unit generates conversion result B using a model-to-model conversion table suitable for a model of the second electronic apparatus and conversion result A.

FIG. 14 illustrates an example of a sequence diagram of a procedure when the model-to-model conversion unit 33 generates the conversion result B using the model-to-model conversion table 39*c* suitable for the model of the second electronic apparatus 40-2 and the conversion result A.

S141: The model-to-model conversion unit 33 acquires the conversion result A from the input data conversion unit 32.

S142: As described with reference to FIG. 10, the model-to-model conversion unit 33 generates the conversion result B by associating the data type and the set value set in the conversion result A, the module ID, the preference ID, and the common IDs 1 and 2 set in the model-to-model conversion table 39*c* suitable for the second electronic apparatus 40-2.

S143: The model-to-model conversion unit 33 transmits the conversion result B to the output data conversion unit 34.

Figure 15:
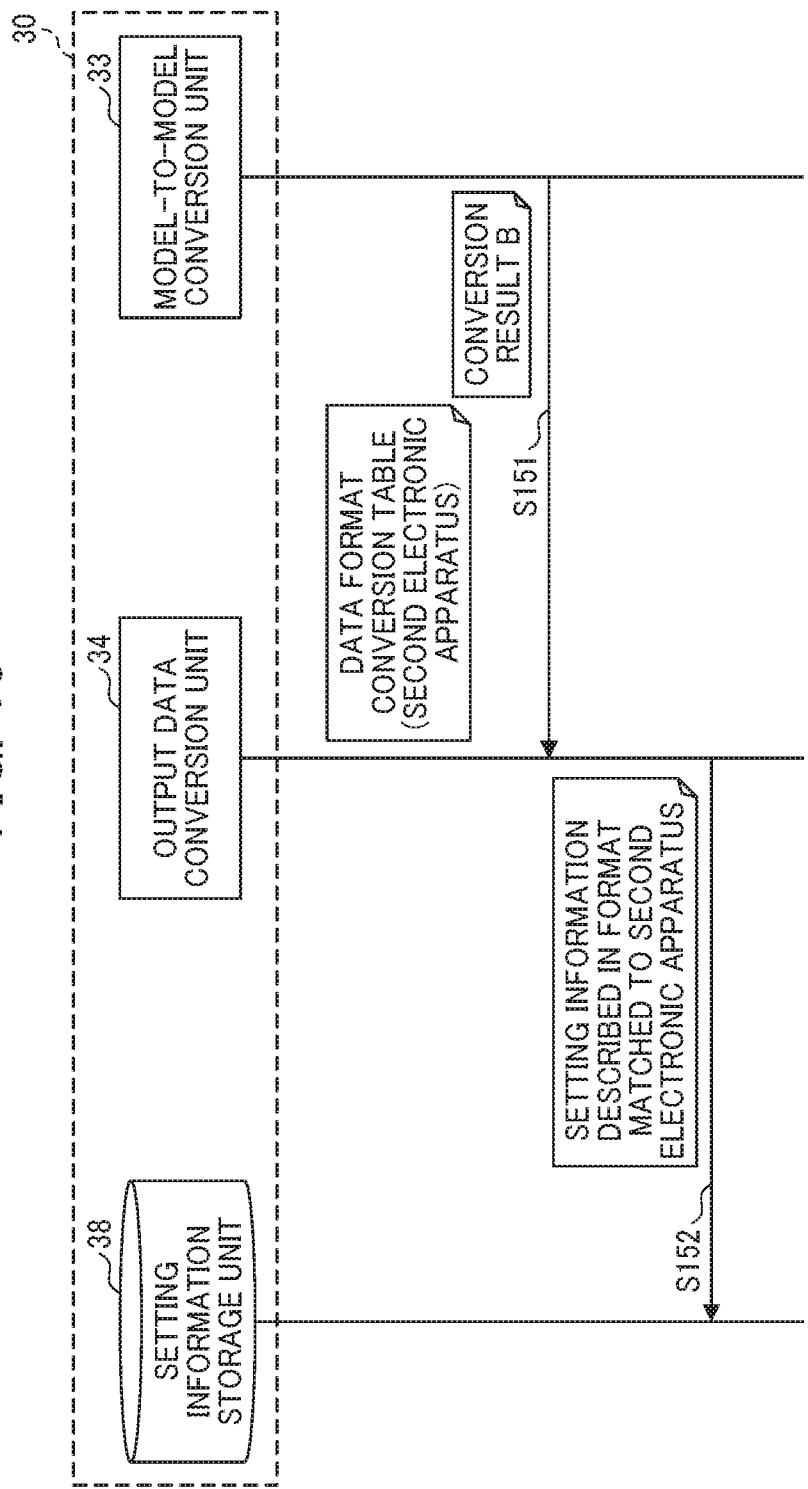
FIG. 15 illustrates an example of a sequence diagram when an output data conversion unit generates setting information described in a format matched to the second electronic apparatus using a data format conversion table suitable for a model of the second electronic apparatus and conversion result B.

FIG. 15 illustrates an example of a sequence diagram when the output data conversion unit 34 generates the setting information 8 described in the format matched to the second electronic apparatus 40-2 using the data format conversion table 39*b* suitable for the model of the second electronic apparatus 40-2 and the conversion result B.

S151: The model-to-model conversion unit 33 transmits the conversion result B to the output data conversion unit 34.

S152: The output data conversion unit 34 reads out the area ID and the offset from the data format conversion table 39b, which is suitable for the model of the second electronic apparatus 40-2 identified by the module ID and the preference ID of the conversion result B, and arranges the set value set in the conversion result B based on the data type and length in the storage location designated by the read area ID and the offset.

With this configuration, in the conversion server 30, the setting information 8 of the first electronic apparatus 40-1 is converted into the setting information 8 of the second electronic apparatus 40-2, and the setting information 8 associated with the apparatus ID is stored in the setting information storage unit 38.

Figure 16:
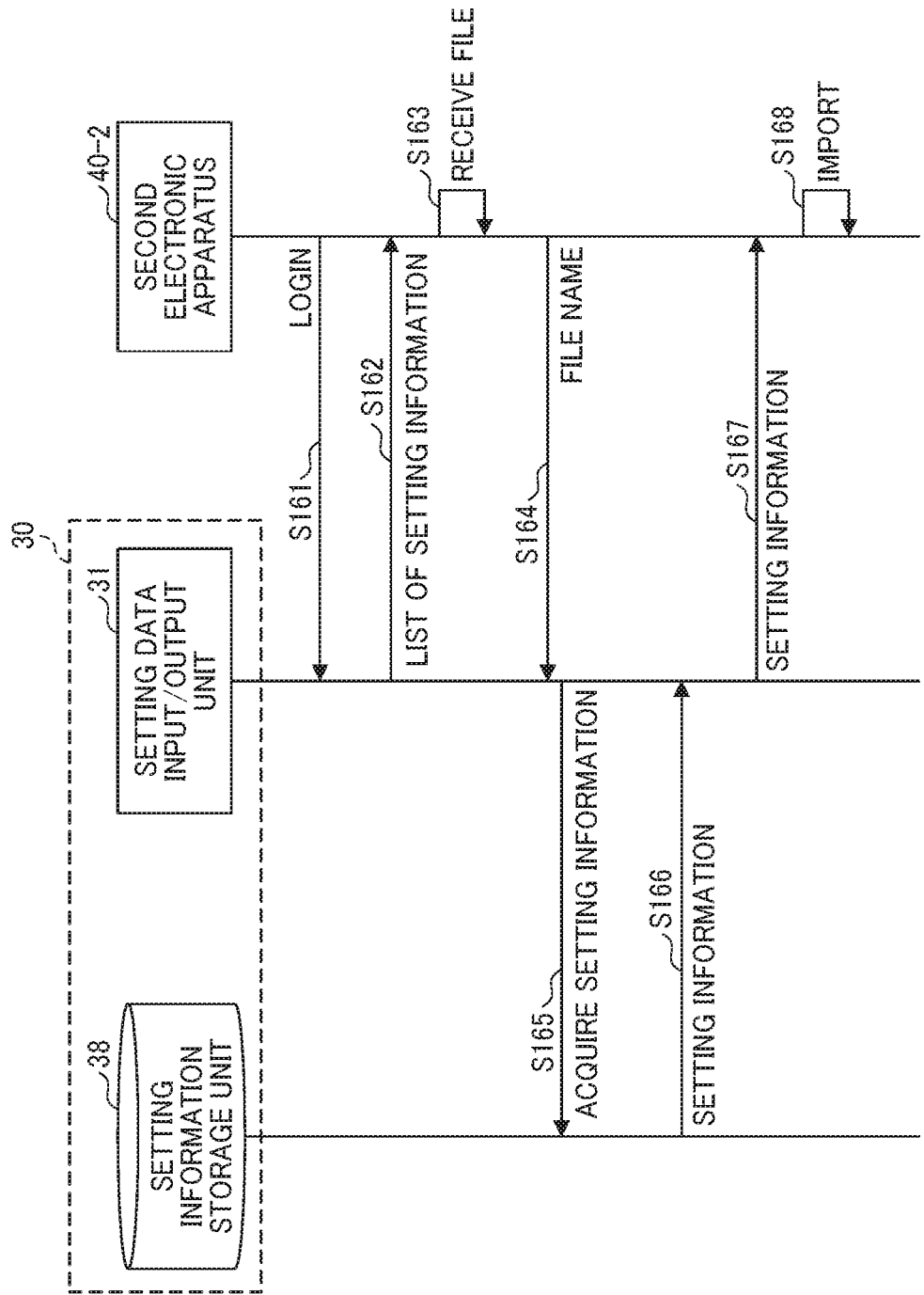
FIG. 16 illustrates an example of a sequence diagram when the second electronic apparatus imports setting information from the conversion server.

Import:

FIG. 16 illustrates an example of a sequence diagram when the second electronic apparatus 40-2 imports the setting information 8 from the conversion server 30.

S161: When the display/operation unit 41 of the second electronic apparatus 40-2 receives a login ID and a password from a CE or user, the setting data transmitting unit 42 transmits a log-in request to the conversion server 30. In the embodiment, it is assumed that the CE or user logs in successfully.

S162: The setting data input/output unit 31 of the conversion server 30 identifies the apparatus ID of the electronic apparatus 40 used by the user that has logged in by referring to the user information management table 39a, generates a list of setting information (e.g., file names), associated with the apparatus ID by referring to the setting information management table (Table 6), and transmits the list of setting information to the second electronic apparatus 40-2.

S163: The display/operation unit 41 of the second electronic apparatus 40-2 receives a selection of the to-be-imported setting information (e.g., file) from the CE or user.

S164: The setting data transmitting unit 42 of the second electronic apparatus 40-2 transmits the selected file name to the conversion server 30.

S165, S166: The setting data input/output unit 31 of the conversion server 30 reads out the setting information 8 from the setting information storage unit 38, and transmits the read setting information 8 to the setting data input/output unit 31.

S167: The setting data input/output unit 31 of the conversion server 30 transmits the read setting information 8 to the second electronic apparatus 40-2.

S168: The setting data setting unit 45 of the second electronic apparatus 40-2 sets the setting information 8 in the storage unit 49 via the basic function unit 46, in which the second electronic apparatus 40-2 imports the setting information 8 from the conversion server 30.

With this configuration, the setting information 8 of the first electronic apparatus 40-1 which is converted into the setting information 8 described in the format matched to the second electronic apparatus 40-2, is imported and set in the second electronic apparatus 40-2.

Although the conversion using the pattern 1 is described in this description, in a case of using the pattern 2, in the sequence of FIG. 12, the first electronic apparatus 40-1 writes the setting information 8 to the recording medium 9, in the conversion processing of FIGS. 13 to 15, the terminal apparatus 60 transmits the setting information 8 stored in the recording medium 9 to the conversion server 30, and receives the setting information 8 converted by the conversion server 30 from the conversion server 30 and stores the setting information 8 in the recording medium 9, and then, in the sequence of FIG. 16, the second electronic apparatus 40-2 imports the setting information 8 from the recording medium 9.

Conversion of Service Setting Data:

The conversion of the memory data 8b is performed as above described with reference to FIGS. 9 to 11. Hereinafter, the conversion of the service setting data 8c is described with reference to FIGS. 17 and 18. The conversion procedure of the service setting data 8c is similar to that of the memory data 8b.

Figure 18:
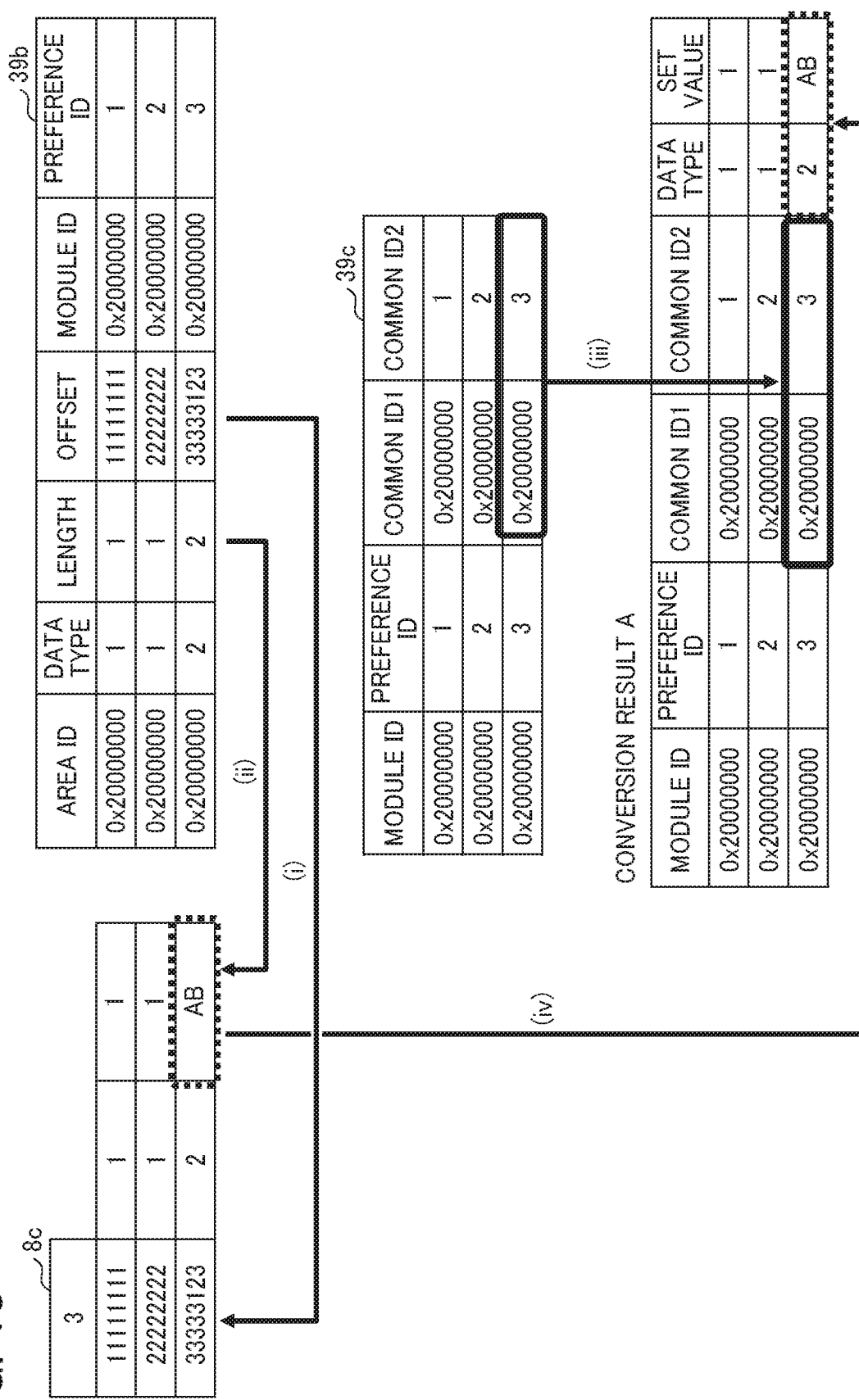
FIG. 18 illustrates an example of conversion result A generated from service setting data and a data format conversion table of the first electronic apparatus.

FIG. 17 illustrates an example of a storage format of the service setting data 8c. The service setting data 8c registers a number (e.g., SP number), a length, and a set value by associating these as one set. The number of entry indicates the number of setting items of the service setting data 8c. The number indicates identification information of the service setting data 8c. The length indicates a length of the set value. The set value indicates a value set for the setting item. FIG. 18 illustrates an example of the conversion result A generated from the service setting data 8c, and the data format conversion table 39b of the first electronic apparatus 40-1.

(i) The input data conversion unit 32 identifies a storage location of a set value of the service setting data 8c based on the area ID and offset defined in the data format conversion table 39b suitable for the model of the first electronic apparatus 40-1.

(ii) The input data conversion unit 32 reads out the set value having the length using the format identified by the data type.

(iii) The input data conversion unit 32 refers to the model-to-model conversion table 39c suitable for the model of the first electronic apparatus 40-1 to search a module ID and a preference ID, which are the same module ID and preference ID set in the data format conversion table 39b, and then reads out the common IDs 1 and 2, corresponding to the searched module ID and preference ID, from the model-to-model conversion table 39c.

(iv) The input data conversion unit 32 stores the module ID, the preference ID, the common IDs 1 and 2, the data type, and the set value as the conversion result A by associating these.

In an example illustrated in FIG. 18, the set value "AB" of the service setting data 8c is read out using the data format conversion table 39b of the first electronic apparatus 40-1. Then, the set value "AB" is saved with the module ID, the preference ID, the common IDs 1 and 2, the data type of the data format conversion table 39b as the conversion result A.

The method of generating the conversion result B and the method of generating the service setting data 8c described in the format matched to the second electronic apparatus 40-2 using the conversion result B are similar to those for the memory data 8b.

Encryption Region:

The setting information 8 transmitted to the conversion server 30 from the first electronic apparatus 40-1 may include, for example, sensitive information such as highly confidential information. For example, the setting information 8 includes a password and address information of an administrator as the sensitive information. If the sensitive information is transmitted directly to the conversion server 30, a risk of information leakage may occur so that the first electronic apparatus 40-1 encrypts the sensitive information before transmitting the sensitive information. The setting item to be encrypted is specified in the model profile 7 prepared for each model.

Figure 19:
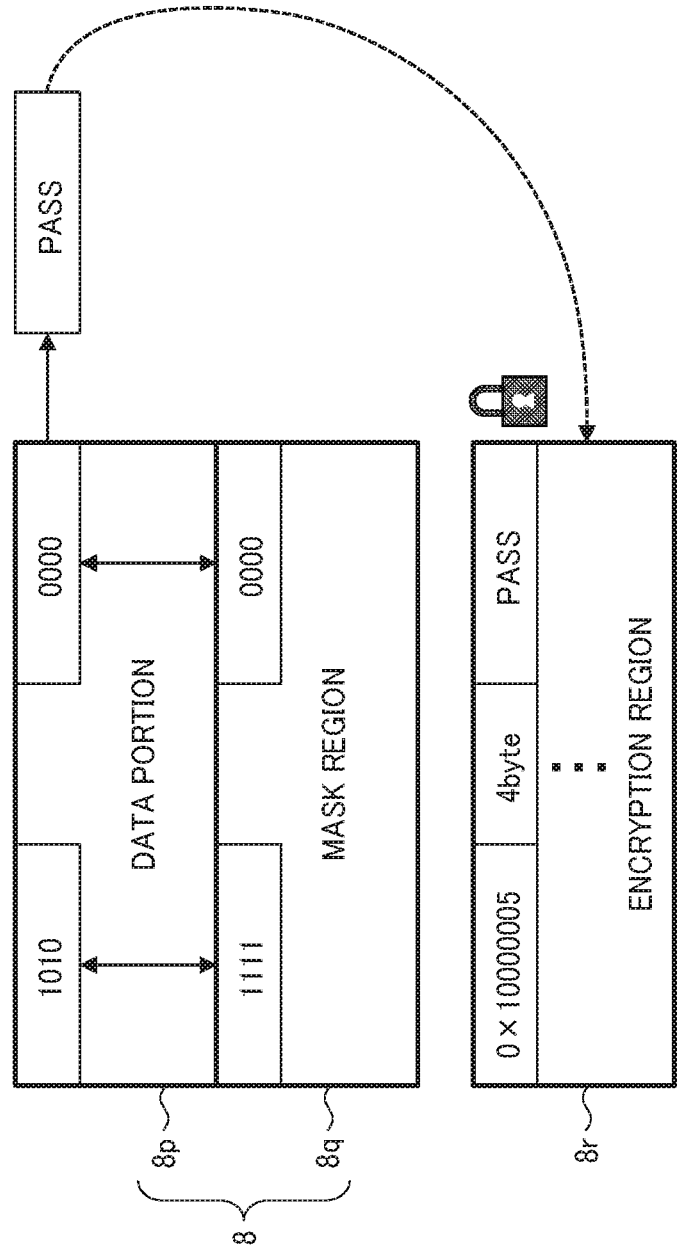
FIG. 19 schematically illustrates an example of encryption of a setting item.

Hereinafter, a description is given of an encryption of a setting item having higher confidentiality with reference to FIG. 19. FIG. 19 schematically illustrates an example of encryption of a setting item. The setting information 8 includes, for example, a data portion 8*p*, and a mask region 8*q*. Further, a set value of "PASS" is set in the setting information 8 as an example of the setting item to be encrypted. In this example case, "PASS" indicates a password. To encrypt the password, the setting data acquiring unit 44 copies "PASS" into an encryption region 8*r*, and fills the original area in the data portion 8*p* with "0."

The mask region 8*q* is prepared by corresponding the mask region 8*q* to the data portion 8*p*. For example, a size of the mask region 8*q* is set with the same size of the data portion 8*p*, or one bit of the mask region 8*q* may be corresponded to one byte of the data portion 8*p*. The mask region 8*q* indicates whether the setting item in the corresponding region is valid. When "1" is set in the mask region 8*q*, the set value of the corresponding setting item is valid, and when "0" is set in the mask region 8*q*, the set value of the corresponding setting item is invalid. Therefore, the mask region 8*q* is set with "1" entirely in the initial state, and set with "0" for the corresponding setting item to be encrypted.

For example, in the encryption region 8*r*, the length and the set value (e.g., PASS) are stored in association with the preference ID. The encryption region 8*r* can include the module ID. Since the encryption region 8*r* is provided for each module, the module ID is omitted in an example case of FIG. 19. When a CE or user inputs an encryption key to the first electronic apparatus 40-1 the first electronic apparatus 40-1 encrypts the encryption region 8*r*.

The encryption region 8*r* is not decoded at the conversion server 30, and is transmitted to the second electronic apparatus 40-2, which is a destination of the data. As described above, since the set value of the encryption target is copied from the setting information 8 to the encryption region 8*r*, and the original set value is replaced with "0," a risk of information leakage can be reduced, and in particular, can be prevented.

When the second electronic apparatus 40-2 receives the setting information 8, the second electronic apparatus 40-2 decrypts the encryption region 8*r* using the encryption key input by the CE or user. Then, the set value of the data portion 8*p* corresponding to the mask region 8*q* set with "1" is set in the storage unit 49 as it is. The set value of the data portion 8*p* corresponding to the mask region 8*q* set with "0" is not acquired from the data portion 8*p*, but the set value of the encryption region 8*r* is acquired based on the preference ID of the set value, and the set value is set in the storage unit 49. For example, if the data format conversion table 39*b* suitable for the model of the second electronic apparatus 40-2 exists, the storage location of the set value corresponding to the mask region 8*q* set with "0" can be identified, and thus the preference ID of the set value can be identified. Then, the set value associated with the preference ID can be acquired from the encryption region 8*r*.

Further, "1" indicating that the set value is valid and "0" indicating that the set value is invalid can be replaced with any symbol (e.g., character, number) if the symbol indicates valid or invalid.

Figure 20:
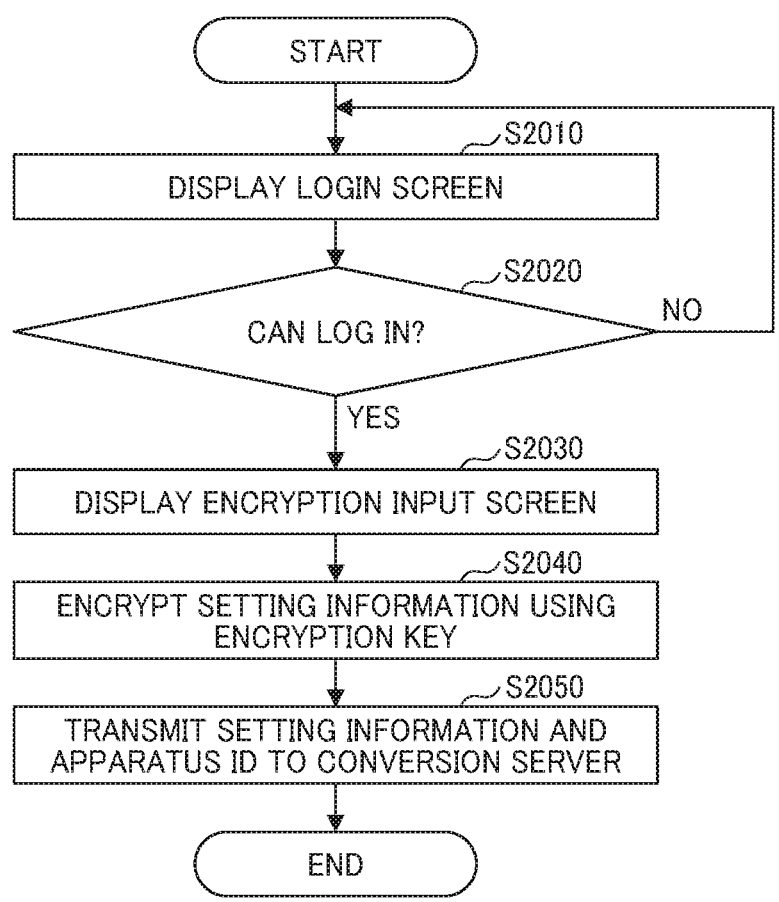
FIG. 20 is an example of a flowchart illustrating the steps of an operation of the first electronic apparatus when exporting data using pattern 1.

Export and Import Procedure:

FIG. 20 is an example of a flowchart illustrating the steps of an operation of the first electronic apparatus 40-1 when exporting data using the pattern 1 of FIG. 8.

In response to an operation of a CE or user, the display/operation unit 41 of the first electronic apparatus 40-1 displays a login screen on the operation panel 27 (S2010). The login screen is used for receiving a user ID and a password.

Then, the setting data transmitting unit 42 of the first electronic apparatus 40-1 determines whether the user can log in successfully (S2020). If the user cannot log in, the login screen is displayed again.

If the determination in step S2020 is "YES," the display/operation unit 41 of the first electronic apparatus 40-1 displays an encryption input screen on the operation panel 27 (S2030). Then, the display/operation unit 41 of the first electronic apparatus 40-1 receives an input of an encryption key via the encryption input screen.

Then, the setting data acquiring unit 44 of the first electronic apparatus 40-1 encrypts the setting information 8 using the encryption key (S2040). As described above, the setting item, which is instructed to be the encrypted by the model profile 7, is saved in the encryption region 8*r* and then encrypted using the encryption key. Further, the set value of the setting item instructed to be encrypted is replaced with "0."

Then, the setting data transmitting unit 42 of the first electronic apparatus 40-1 transmits the setting information 8 and the apparatus ID to the conversion server 30 (step 2050).

Figure 21:
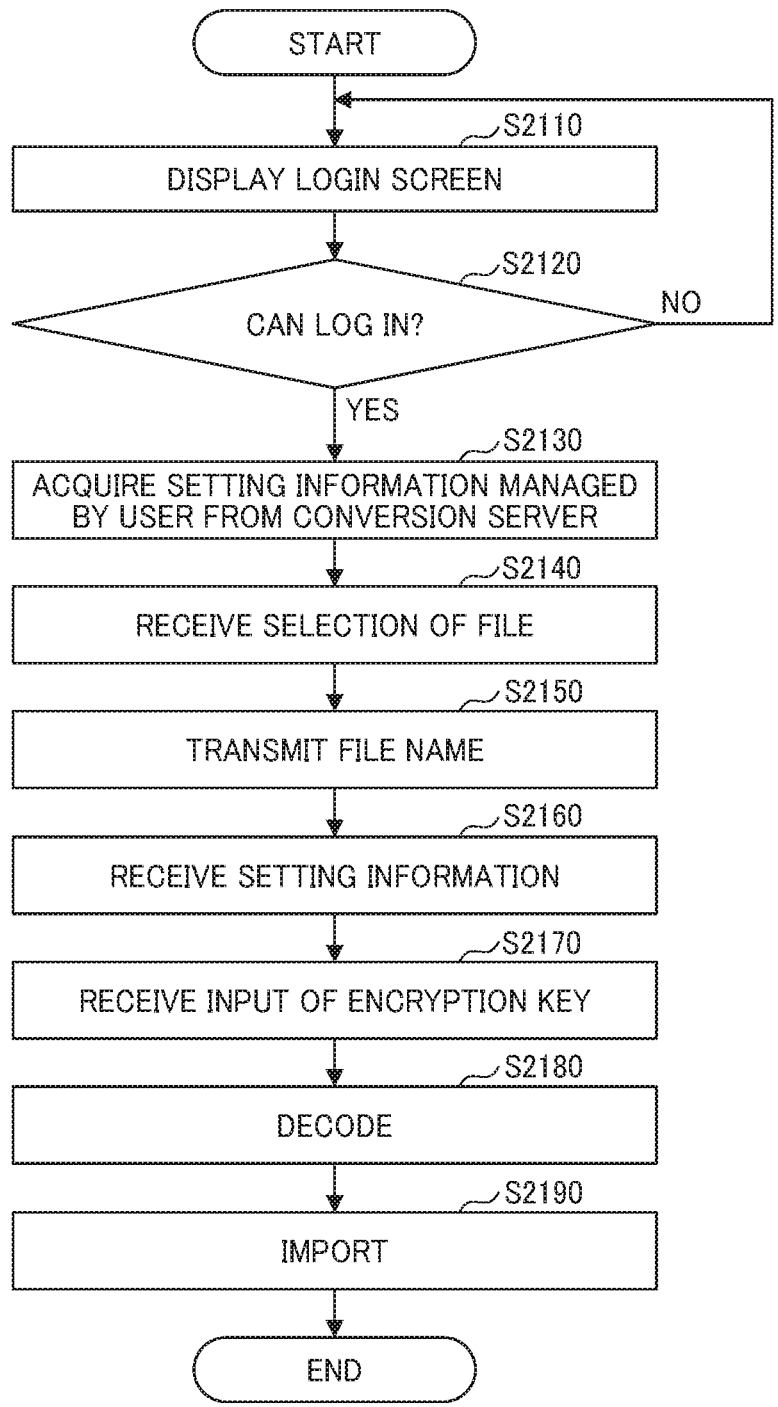
FIG. 21 is an example of a flowchart illustrating the steps of an operation of the second electronic apparatus when importing data using pattern 1.

FIG. 21 is an example of a flowchart illustrating the steps of an operation of the second electronic apparatus 40-2 when importing data using the pattern 1 of FIG. 8.

In response to the operation of the CE or user, the display/operation unit 41 of the second electronic apparatus 40-2 displays a login screen on the operation panel 27 (S2110). The login screen is used for receiving a user ID and a password.

Then, the setting data transmitting unit 42 of the second electronic apparatus 40-2 determines whether the user can log in successfully (S2120). If the user cannot log in, the login screen is displayed again.

If the determination in step S2120 is "YES," the setting data receiving unit 43 of the second electronic apparatus 40-2 acquires a list of the setting information 8 managed by the user (e.g., customer) from the conversion server 30 (S2130). That is, the setting data receiving unit 43 receives the setting information 8 from the conversion server 30. The "file of setting information" stored in the setting information storage unit 38, identified by the log-in operation, becomes the list of the setting information 8. Further, the setting information 8 is already converted into the setting information 8 described in the format matched to the second electronic apparatus 40-2. The display/operation unit 41 of the second electronic apparatus 40-2 displays a list of the setting information 8 to be imported on the operation panel 27.

Then, the display/operation unit 41 of the second electronic apparatus 40-2 receives a selection of to-be-imported setting information such as one or more files (step 2140).

The setting data transmitting unit 42 of the second electronic apparatus 40-2 transmits information (e.g., file name) identifying the one or more files to the conversion server 30 (S2150).

The setting data receiving unit 43 of the second electronic apparatus 40-2 receives the setting information 8 identified by the file name from the conversion server 30 (step 2160).

After the setting data receiving unit 43 of the second electronic apparatus 40-2 receives the setting information 8, the display/operation unit 41 of the second electronic apparatus 40-2 displays an encryption input screen on the operation panel 27, and receives an input of the encryption key (step 2170).

The setting data setting unit 45 of the second electronic apparatus 40-2 decodes the setting information 8 using the encryption key (step 2080), in which the encryption region 8r is decoded as described above.

The setting data setting unit 45 of the second electronic apparatus 40-2 imports the setting information 8 (step 2190). That is, as to the setting item corresponding to the mask region 8q set with "1," a set value in the data portion 8p is set in the storage unit 49, and as to the setting item corresponding to the mask region 8q set with "0," a set value in the encryption region 8r is read and set in the storage unit 49.

As described above, since the information having higher confidentiality is encrypted, a risk of information leakage at the conversion server 30 can be reduced.

In the above described the setting information handling system 100 of the embodiment, the setting information 8 such as the memory data 8b and the service setting data 8c, which have been difficult to convert using conventional methods, can be converted using the conversion server 30 in consideration of the memory space, storage location, and data type variably set for each model of the electronic apparatus 40, and thus the memory data 8b and the service setting data 8c may not be required to be customized by the CE or the user after importing the setting information 8. Therefore, the manual workloads of the CE or user after importing the setting information 8 can be reduced. Further, since the memory data 8b and the service setting data 8c are converted into the data using the common format, the CE or user can view and change the data before importing the data.

Other Applications:

While the present invention has been described with reference to the above described embodiment, the present invention is not limited to such embodiment, but it is possible to add various modifications and substitutions within the scope of the spirit of the present invention without departing from the scope of the spirit of the present invention.

Further, the configurations described in FIG. 5 and FIG. 7 illustrate functions divided in several functions to facilitate the understanding of processing by the electronic apparatus 40 and the conversion server 30. However, the present invention is not limited by the processing-dividing scheme and names of the processing units. The processing of the electronic apparatus 40 and the conversion server 30 can also be divided into more processing units in accordance with the processing contents. Further, the processing can be divided so that one processing unit includes more processing.

Further, the functions of the conversion server 30 may be implemented using a plurality of servers, or each of the tables stored in the conversion server 30 may be stored in one or more locations where the conversion server 30 is accessible.

Further, the setting data input/output unit 31 is an example of the setting information acquiring unit, the input data conversion unit 32 is an example of a first conversion unit, the model-to-model conversion unit 33 is an example of a second conversion unit, and the output data conversion unit 34 is an example of a third conversion unit.

Further, the data format conversion table 39b suitable for the model of the first electronic apparatus 40-1 is an example of first conversion information, the model-to-model conversion table 39c suitable for the model of the first electronic apparatus 40-1 is an example of second conversion information, the model-to-model conversion table 39c suitable for the model of the second electronic apparatus 40-2 is an example of third conversion information, the data format conversion table 39b suitable for the model of the second electronic apparatus 40-2 is an example of fourth conversion information, and the model profile 7 suitable for the model of the first electronic apparatus 40-1 is an example of fifth conversion information.

The setting data acquiring unit 44 is an example of an acquiring unit, the setting data transmitting unit 42 or the setting data writing unit 47 is an example of a storage unit, the setting data receiving unit 43 or the setting data reading unit 48 is an example of a setting information acquisition unit, and the setting data setting unit 45 is an example of a setting information setting unit.

Further, the above described embodiment applied to the electronic apparatus 40 can be also applied to any apparatus having different models, which may transfer the setting information among apparatuses of different models. The apparatus may be an information processing apparatus (e.g., computer) or an apparatus having the information processing apparatus (e.g., computer-mounted vehicle).

Conventional arts have devised a technique for supporting a transfer process of setting information from one electronic apparatus (hereinafter, first electronic apparatus) to another electronic apparatus (hereinafter, second electronic apparatus). The conventional arts disclose an electronic apparatus that can set setting information based on a setting policy of the electronic apparatus.

However, in the conventional arts, since the setting items are converted based on the setting information in accordance with the setting policy, additional manual work may be required to customize the setting items in line with user's preference. For example, some setting information may be affected by differences in memory spaces of the first electronic apparatus and the second electronic apparatus, and thus the storage location of a set value may differ between different models. In such a case, even if the setting information is set based on the setting policy, the second electronic apparatus cannot use the setting information of the first electronic apparatus.

The above described embodiment provides an information processing apparatus that can reduce manual setting workloads for setting information of electronic apparatuses.

Although the description of the present invention describes the electronic apparatuses as an example of apparatuses that transfer setting information between the apparatuses, the description of the present invention can be applied to any apparatus configured to transfer setting information between the apparatuses as required.

Although the description of the present invention has been made based on the embodiments described above, the present invention is not limited to the requirements described in the above embodiments. Numerous additional modifications and variations are possible in light of the above teachings. It is therefore to be understood that, within the scope of the appended claims, the disclosure of this patent specification may be practiced otherwise than as specifically described herein.

Each of the functions of the above described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

As described above, the present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

What is claimed is:

1. An information processing apparatus configured to convert first setting information set for a first electronic apparatus of a plurality of models of electronic apparatuses into second setting information set for a second electronic apparatus of the plurality of models of electronic apparatuses, the information processing apparatus comprising:
a memory storing a plurality of between-different-models conversion tables, the plurality of between-different-models conversion tables including a first between-different-models conversion table associated with the first electronic apparatus and a second between-different-models conversion table associated with the second apparatus; and
processing circuitry configured to,
import the first setting information including one or more setting items related to settings of the first electronic apparatus from the first electronic apparatus,
determine a set value of each of the setting items and first identification information of each of the setting items based on the first setting information,
determine common identification information of each of the setting items based on the first identification information and the first between-different-models conversion table, the common identification information being common to the plurality of models of electronic apparatuses, and the first between-different-models conversion table being a table associating the common identification information and first unique identification information, the first unique identification information being unique to the first electronic apparatus,
generate a first conversion result by associating the set value of each of the setting items with the common identification information of each of the setting items, and the first identification information of each of the setting items,
determine second identification information of each of the setting items for the second electronic apparatus based on the first conversion result and the second between-different-models conversion table, the second between-different-models conversion table being a table associating the common identification information and second unique identification information, the second unique identification information being unique to the second electronic apparatus,
generate a second conversion result by associating the set value of each of the setting items with the common identification information of each of the setting items, and the second identification information of each of the setting items,
determine the second setting information of each of the setting items for the second electronic apparatus based on the second conversion result, and
export the second setting information to configure a memory space in the second electronic apparatus based on the second setting information.

2. The information processing apparatus of claim 1, wherein,
the memory further stores a plurality of data format conversion tables, the plurality of data format conversion tables including a first data format conversion table,
the first data format conversion table includes a data type of the set value of each of the setting items, and
the processing circuitry is further configured to,
acquire the set value from a storage location of the first electronic apparatus based on the data type included in the first data format conversion table, and
convert the first setting information to setting information common to the plurality of models of electronic apparatuses by associating the acquired set value and the common identification information.

3. The information processing apparatus of claim 2, wherein
the memory further stores a specific information set for each of the setting items associated with the common identification information of each of the setting items.

4. The information processing apparatus of claim 1, wherein,
the memory further stores a plurality of data format conversion tables, the plurality of data format conversion tables including a second data format conversion table,
the second data format conversion table includes a data type of the set value for each of the setting items, and
the processing circuitry is further configured to
determine the second setting information additionally based on the data type, and
convert the common identification information into the second setting information, wherein the second setting information is described in a second format matched to the second electronic apparatus.

5. The information processing apparatus of claim 1, wherein,
the first setting information includes at least one of memory data including binary data, and service setting data related to an engine setting, the engine setting configured to provide a basic function of the first electronic apparatus and the second electronic apparatus, and
the first setting information is stored in a the memory.

6. The information processing apparatus of claim 1, wherein the processing circuitry is further configured to,
import the first setting information and export the second setting information using a communication protocol of encrypted communication.

7. A system comprising:
the information processing apparatus of claim 1; and
a terminal apparatus communicable with the information processing apparatus, the terminal apparatus including second processing circuitry configured to,
communicate with the information processing apparatus, determine whether to acquire the set value for each of the setting items, acquire the set value, from the memory when the set value for each of the setting items is determined to be acquired, the memory further storing the first setting information, and transmit the acquired set value to any one of the information processing apparatus and a recording medium.

8. A method of converting first setting information set for a first electronic apparatus of a plurality of models of electronic apparatuses to setting information set for a second electronic apparatus of the plurality of models of electronic apparatuses, the method comprising:

importing the first setting information including one or more setting items related to settings of the first electronic apparatus from the first electronic apparatus;

determining a set value of each of the setting items and first identification information of each of the setting items based on the first setting information;

determining common identification information of each of the setting items based on the first identification information and a first between-different-models conversion table associated with the first electronic apparatus, the common identification information being common to the plurality of models of electronic apparatuses, and the first between-different-models conversion table being a table associating the common identification information and first unique identification information, the first unique identification information being unique to the first electronic apparatus;

generating a first conversion result by associating the set value of each of the setting items with the common identification information of each of the setting items, and the first identification information of each of the setting items;

determining second identification information of each of the setting items for the second electronic apparatus based on the first conversion result and a second between-different-models conversion table associated with the second electronic apparatus, the second between-different-models conversion table being a table associating the common identification information and second unique identification information, the second unique identification information being unique to the second electronic apparatus;

generating a second conversion result by associating the set value of each of the setting items with the common identification information of each of the setting items, and the second identification information of each of the setting items;

determining second setting information of each of the setting items for the second electronic apparatus based on the second conversion result; and exporting the second setting information to configure a memory space in the second electronic apparatus based on the second setting information.

9. The method of claim 8, wherein, the method further comprises:

acquiring the set value from a storage location of the first electronic apparatus based on a data type of the set value of each of the setting items, the data type being included in a first data format conversion table; and converting the first setting information to setting information common to the plurality of models of electronic apparatuses by associating the acquired set value and the common identification information.

10. The method of claim 8, wherein, the method further comprises:

determining the second setting information additionally based on a data type; and converting the common identification information into the second setting information, wherein the second setting information is described in a second format matched to the second electronic apparatus.

11. The method of claim 8, wherein, the first setting information includes at least one of memory data including binary data, and service setting data related to an engine setting, the engine setting configured to provide a basic function of the first electronic apparatus and the second electronic apparatus, and the first setting information is stored in a nonvolatile memory.

12. The method of claim 8, wherein, the importing the first setting information and the exporting the second setting information include using a communication protocol of encrypted communication.

13. A non-transitory computer readable storage medium storing one or more instructions that, when executed by one or more processors, cause the one or more processors to execute a method of handling setting information using an information processing apparatus converting first setting information set for a first electronic apparatus of a plurality of models of electronic apparatuses into second setting information set for a second electronic apparatus of the plurality of models of electronic apparatuses, the method comprising:

importing the first setting information including one or more setting items related to settings of the first electronic apparatus from the first electronic apparatus;

determining a set value of each of the setting items and first identification information of each of the setting items based on the first setting information;

determining common identification information of each of the setting items based on the first identification information and a first between-different-models conversion table associated with the first electronic apparatus, the common identification information being common to the plurality of models of electronic apparatuses, and the first between-different-models conversion table being a table associating the common identification information and first unique identification information, the first unique identification information being unique to the first electronic apparatus;

generating a first conversion result by associating the set value of each of the setting items with the common identification information of each of the setting items, and the first identification information of each of the setting items;

determining second identification information of each of the setting items for the second electronic apparatus based on the first conversion result and a second between-different-models conversion table associated with the second electronic apparatus, the second between-different-models conversion table being a table associating the common identification information and second unique identification information, the second unique identification information being unique to the second electronic apparatus;

generating a second conversion result by associating the set value of each of the setting items with the common identification information of each of the setting items, and the second identification information of each of the setting items;

determining the second setting information of each of the setting items for the second electronic apparatus based on the second conversion result; and exporting the second setting information to configure a memory space in the second electronic apparatus based on the second setting information.

14. The non-transitory computer readable storage medium of claim 13, wherein, the method further comprises:

acquiring the set value from a storage location of the first electronic apparatus based on a data type of the set value of each of the setting items, the data type being included in a first data format conversion table, and converting the first setting information to setting information common to the plurality of models of electronic apparatuses by associating the acquired set value and the common identification information.

15. The non-transitory computer readable storage medium of claim 13, wherein, the method further comprises:

determining the second setting information additionally based on a data type; and converting the common identification information into the second setting information, the second setting information being described in a second format matched to the second electronic apparatus.

16. The non-transitory computer readable storage medium of claim 13, wherein, the first setting information includes at least one of memory data including binary data, and service setting data related to an engine setting, the engine setting configured to provide a basic function of the first electronic apparatus and the second electronic apparatus, and the first setting information is stored in a nonvolatile memory.

17. The non-transitory computer readable storage medium of claim 13, wherein, the importing the first setting information and the exporting the second setting information include using a communication protocol of encrypted communication.

18. A system comprising:

the information processing apparatus of claim 1; and the second electronic apparatus of claim 1, the second electronic apparatus including second processing circuitry configured to configure the memory space in the second electronic apparatus based on the second setting information exported by the information processing apparatus.

19. A system comprising:

the information processing apparatus of claim 1; and a terminal apparatus communicable with the information processing apparatus, the terminal apparatus including second processing circuitry configured to, communicate with the information processing apparatus, import the first setting information from a non-volatile storage device, transmit the first setting information to the information processing apparatus, receive the second setting information from the information processing apparatus, and export the second setting information to the non-volatile storage device.

* * * * *